United States Patent
Ikedo

(10) Patent No.: US 10,313,588 B2
(45) Date of Patent: Jun. 4, 2019

(54) IMAGE CAPTURING SYSTEM AND CONTROL METHOD OF IMAGE CAPTURING SYSTEM

(71) Applicant: CANON KABUSHIKI KAISHA, Tokyo (JP)

(72) Inventor: Hideki Ikedo, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/950,470

(22) Filed: Apr. 11, 2018

(65) Prior Publication Data

US 2018/0302561 A1     Oct. 18, 2018

(30) Foreign Application Priority Data

Apr. 13, 2017 (JP) ................... 2017-079946

(51) Int. Cl.
*H04N 5/232* (2006.01)
*H04N 9/74* (2006.01)

(52) U.S. Cl.
CPC ..... *H04N 5/23241* (2013.01); *H04N 5/23232* (2013.01); *H04N 5/23254* (2013.01); *H04N 9/74* (2013.01)

(58) Field of Classification Search
CPC .......... H04N 5/23232; H04N 5/23241; H04N 5/23254; H04N 9/74
See application file for complete search history.

(56) References Cited

U.S. PATENT DOCUMENTS

| 8,610,800 | B2 | 12/2013 | Ikedo | |
|---|---|---|---|---|
| 8,878,909 | B1* | 11/2014 | Prince | G06T 7/55 348/47 |
| 9,191,595 | B2 | 11/2015 | Ikedo | |
| 9,560,297 | B2 | 1/2017 | Ikedo | |
| 2004/0095492 | A1* | 5/2004 | Baxter | H04N 3/155 348/302 |

FOREIGN PATENT DOCUMENTS

JP     2016-039393 A     3/2016

\* cited by examiner

*Primary Examiner* — Nelson D. Hernández Hernández
(74) *Attorney, Agent, or Firm* — Carter, DeLuca & Farrell LLP

(57) ABSTRACT

An image capturing system comprising: a pixel area including pixels; processors that process an image signal read out from the pixel area; a generation unit that generates readout pixel patterns having different pixel densities and nonuniform pixel patterns used for reading out a signal from the pixels; a setting unit that sets one of the pixel densities for each of divided regions obtained by dividing the pixel area; and a control unit that controls to read out an image signal from each divided region using the readout pixel pattern corresponding to the set pixel density. The setting unit sets the pixel density for each divided region such that a higher pixel density is set to a divided region where image capturing processing with higher image quality is to be performed among the divided regions.

19 Claims, 23 Drawing Sheets

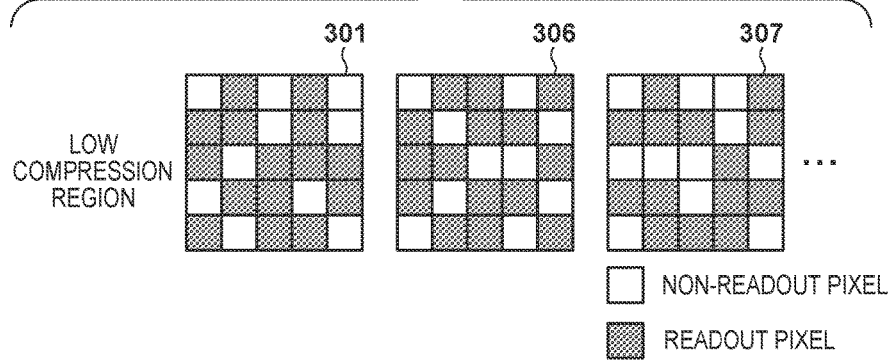
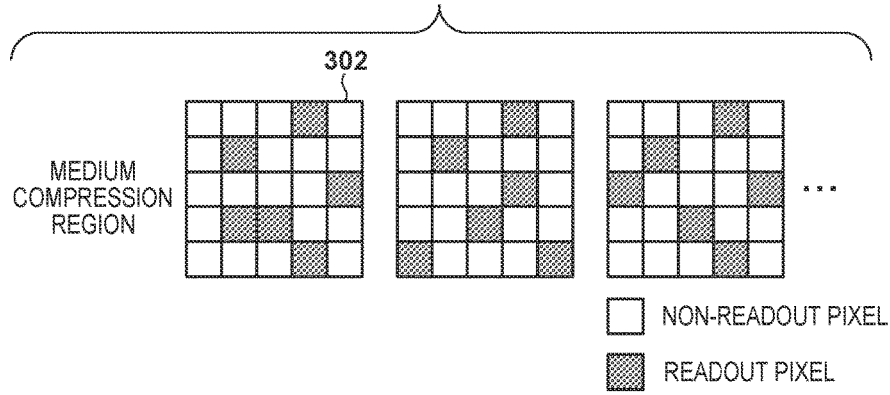
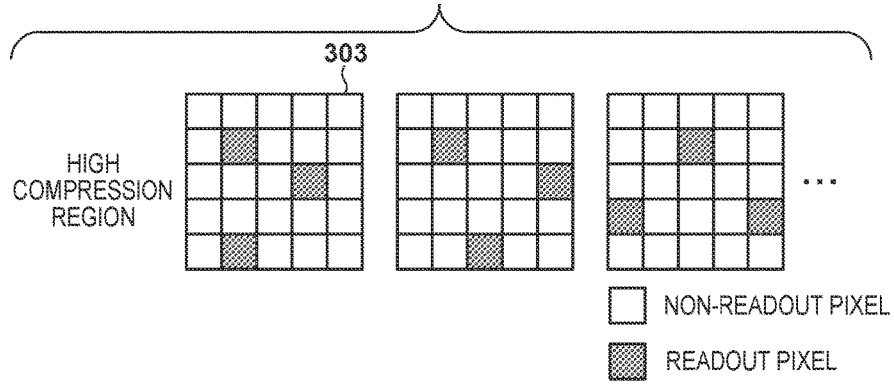

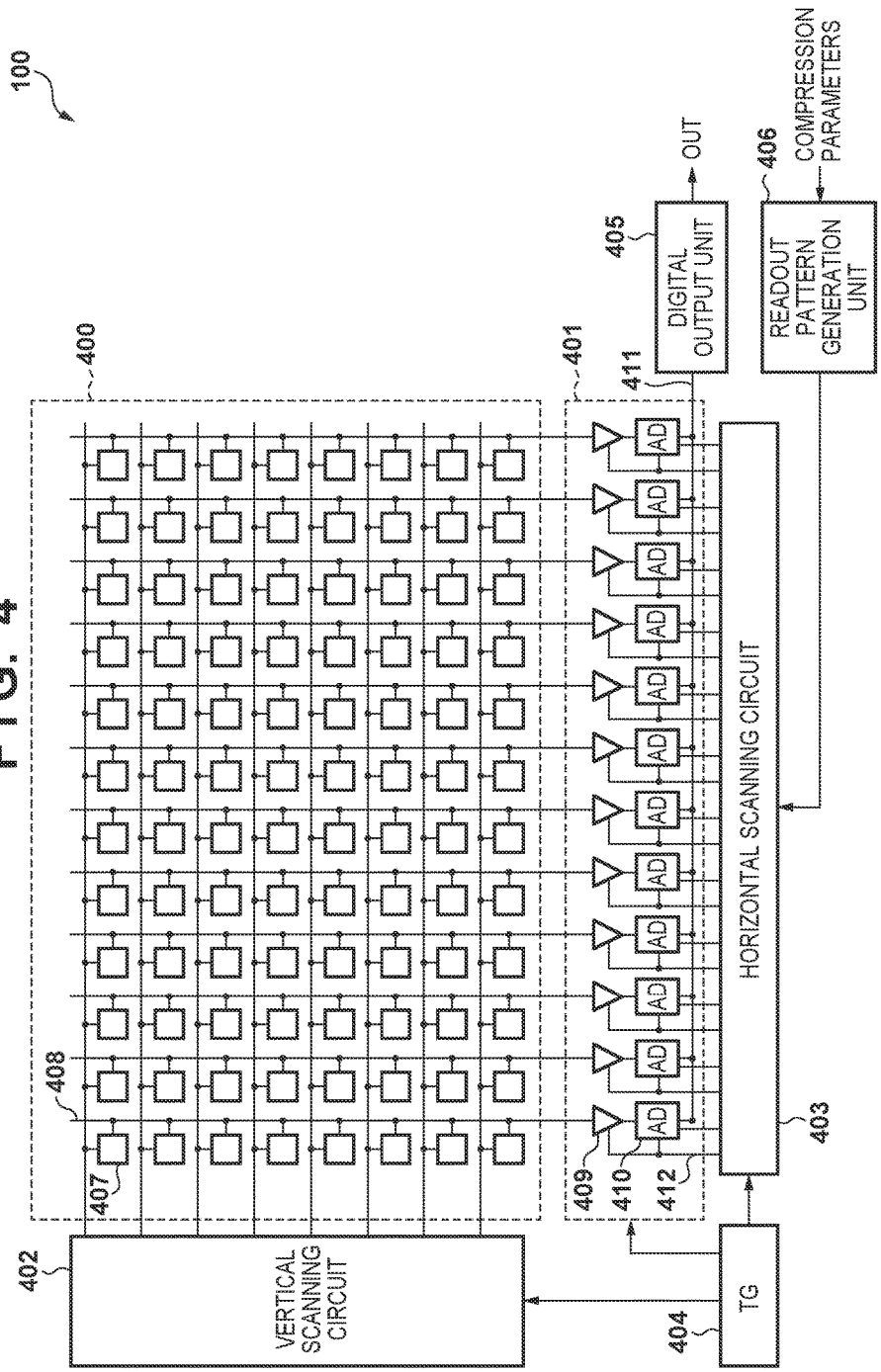

IMAGE CAPTURING SYSTEM AND CONTROL METHOD OF IMAGE CAPTURING SYSTEM

BACKGROUND OF THE INVENTION

Field of the Invention

The present invention relates to an image capturing system and a control method of image capturing system.

Description of the Related Art

Recently, functionality of image sensors used for image capturing apparatuses such as digital still cameras and digital video cameras has been improved.

Japanese Patent Laid-Open No. 2016-39393 proposes a techniques to read out an image signal, in an image capturing apparatus having a plurality of analog-digital (A/D) conversion circuits for converting an analog image signal into a digital signal, while part of the AD conversion circuits are randomly operated. According to this technique, power consumption and data amount required for A/D conversion can be reduced as compared with the case of reading signals of all the pixels of the image capturing apparatus.

However, in the technique described in Japanese Patent Laid-Open No. 2016-39393, although power consumption can be suppressed, there is a problem that image quality is greatly degraded, as compared with the case of reading signals of all the pixels of the image capturing apparatus.

SUMMARY OF THE INVENTION

The present invention has been made in consideration of the above situation, and effectively reduces power consumption while suppressing degradation of image quality when reading an image from an image sensor.

According to the present invention, provided is an image capturing system comprising: a pixel area where a plurality of pixels are arranged in a matrix; a plurality of processors that process an image signal read out from the pixel area; a generation unit that generates a plurality of readout pixel patterns having a plurality of different pixel densities and nonuniform pixel patterns used for reading out a signal from the plurality of pixels; a setting unit that sets one of the plurality of pixel densities for each of a plurality of divided regions obtained by dividing the pixel area; and a control unit that controls to read out an image signal from each of the plurality of divided regions using the readout pixel pattern corresponding to the pixel density set by the setting unit, wherein the setting unit sets the pixel density for each of the plurality of divided regions such that a higher pixel density is set to a divided region where image capturing processing with higher image quality is to be performed among the plurality of divided regions.

Further, according to the present invention, provided is an image capturing system comprising: a pixel area where a plurality of pixels are arranged in a matrix; a plurality of processors that process an image signal read out from the pixel area; a generation unit that generates a plurality of readout pixel patterns having a plurality of different pixel densities and nonuniform pixel patterns used for reading out a signal from the plurality of pixels; a setting unit that sets one of the plurality of pixel densities for each of a plurality of divided regions obtained by dividing the pixel area; and a control unit that controls to read out an image signal from each of the plurality of divided regions using the readout pixel pattern corresponding to the pixel density set by the setting unit, wherein the control unit reduces power supply to the processor corresponding to a pixel from which a signal is not read out of the pixel area on the basis of the readout pixel patterns for the plurality of divided regions.

Furthermore, according to the present invention, provided is a control method of the image capturing system that has a pixel area where a plurality of pixels are arranged in a matrix, a plurality of processors that process an image signal read out from the pixel area, and a generation unit that generates a plurality of readout pixel patterns having a plurality of different pixel densities and nonuniform pixel patterns used for reading out a signal from the plurality of pixels, the method comprising: setting one of the plurality of pixel densities for each of a plurality of divided regions obtained by dividing the pixel area; and controlling to read out an image signal from each of the plurality of divided regions using the readout pixel pattern corresponding to the set pixel density, wherein the pixel density is set for each of the plurality of divided regions such that a higher pixel density is set to a divided region where image capturing processing with higher image quality is to be performed among the plurality of divided regions.

Further, according to the present invention, provided is a control method of the image capturing system that has a pixel area where a plurality of pixels are arranged in a matrix, a plurality of processors that process an image signal read out from the pixel area, and a generation unit that generates a plurality of readout pixel patterns having a plurality of different pixel densities and nonuniform pixel patterns used for reading out a signal from the plurality of pixels, the method comprising: setting one of the plurality of pixel densities for each of a plurality of divided regions obtained by dividing the pixel area; and controlling to read out an image signal from each of the plurality of divided regions using the readout pixel pattern corresponding to the set pixel density, wherein power supply to the processor corresponding to a pixel from which a signal is not read out of the pixel area is reduced on the basis of the readout pixel patterns for the plurality of divided regions.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A to 3C are diagrams showing examples of readout patterns according to a compression ratio in the first embodiment;

FIG. 4 is a diagram showing a configuration of an image sensor according to the first embodiment;

DESCRIPTION OF THE EMBODIMENTS

Exemplary embodiments of the present invention will be described in detail in accordance with the accompanying drawings.

First Embodiment

Figure 1:
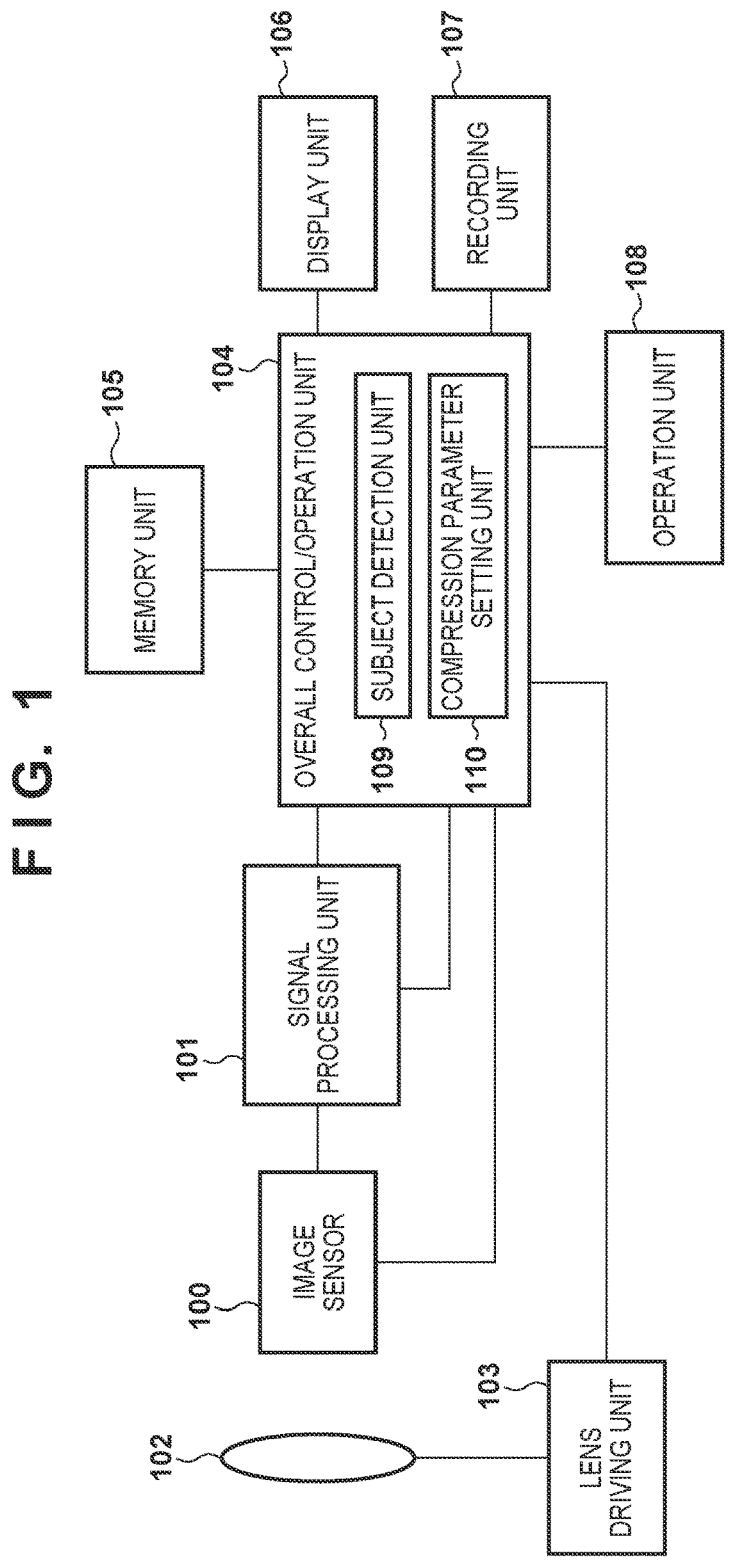
FIG. 1 is a block diagram showing an overall configuration of an image capturing apparatus according to a first embodiment of the present invention.

A first embodiment of the present invention will be described. FIG. 1 is a block diagram showing ab overall configuration of an image capturing apparatus according to the first embodiment. In FIG. 1, an imaging lens 102 is driven by a lens driving unit 103, and zoom control, focus control, aperture control, and the like are performed to form an optical image of a subject on an image sensor 100. The image sensor 100 can capture the optical image of the subject formed by the imaging lens 102 as a signal and can output compressed image data as described later. A signal processing unit 101 performs various correction processes on the signal outputted from the image sensor 100.

An overall control/operation unit 104 performs various arithmetic processing and control of the entire image capturing apparatus. A subject detection unit 109 detects a subject from image data inputted from the signal processing unit 101 or a memory unit 105. A compression parameter setting unit 110 generates compression parameters to be used when outputting compressed image data from the image sensor 100. Details of the compression parameters will be described later. The subject detection unit 109 and the compression parameter setting unit 110 are provided in the overall control/operation unit 104.

The memory unit 105 is used for temporarily storing image data, and a display unit 106 displays various kinds of information and captured images. A recording unit 107 is a removable semiconductor memory or the like for recording or providing image data. An operation unit 108 includes buttons, dials, and the like, and receives inputs corresponding to operation by a user. When the display unit 106 is a touch panel, the touch panel is also included in the operation unit 108.

Next, the concept of compression parameters and image data readout using the compression parameters according to the first embodiment will be described.

Figure 2:
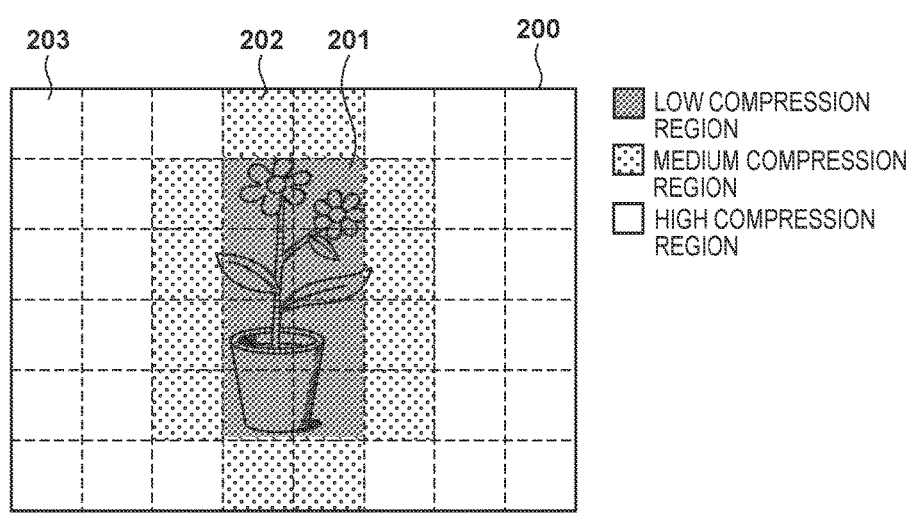
FIG. 2 is a diagram showing an example of setting of a compression ratio by a compression parameter setting unit according to the first embodiment.

FIG. 2 is a diagram showing an example of setting the compression ratio by the compression parameter setting unit 110 based on a subject detection result of the subject detection unit 109. The subject detection unit 109 detects a subject using an image 200 captured in advance. Specifically, edge extraction or the like is performed for each region of a predetermined number of pixel units, and presence or absence of a subject is detected for each region. In the example shown in FIG. 2, the image 200 is divided into 8 (horizontal)×6 (vertical) regions, and presence or absence of a subject is detected for each divided region.

Then, the compression parameter setting unit 110 sets a compression ratio to be used at the time of outputting a pixel signal for each divided region based on the subject detection result. In the example shown in FIG. 2, a region 201 is an area in which a subject image is detected, and a pixel signal of the region 201 is read out with a high density readout pattern which will be described later (hereinafter, the region 201 is referred to as the "low compression region"). A region 203 is an area in which no subject image is detected, a pixel signal of the region 203 is read out with a low density readout pattern which will be described later (hereinafter, the region 203 is referred to as the "high compression region"). A region 202 is an area adjacent to the low compression region out of the regions where no subject image is detected, and a pixel signal of the region 202 is read out with a readout pattern having a density between the densities for the low compression region and the high compression region (hereinafter, the region 202 is referred to as the "medium compression region").

Figure 5:
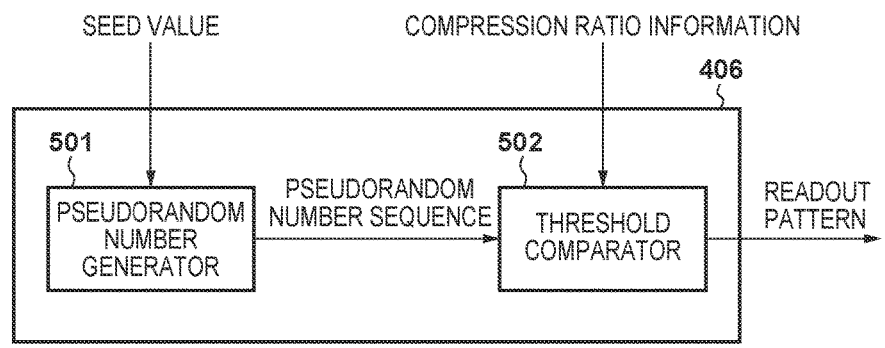
FIG. 5 is a block diagram showing a configuration of a readout pattern generation unit according to the first embodiment.

Here, information indicating which of the low compression region, the medium compression region, and the high compression region each region shown in FIG. 2 is called compression ratio information. Further, an arbitrary value required for generating a pseudorandom number sequence in a readout pattern generation unit 406 described later with reference to FIG. 5 is called a seed value. The compression parameter setting unit 110 determines the compression ratio information of each divided region based on the subject detection result, and also determines the seed value. The compression ratio information and the seed value are collectively referred to as compression parameters, hereinafter. The compression parameters set by the compression parameter setting unit 110 are transmitted to the image sensor 100.

FIGS. 3A to 3C are diagrams for explaining readout patterns corresponding to compression ratio information when a pixel signal is output from the image sensor 100. A readout pattern 301 shown in FIG. 3A is an example of a readout pattern for a low compression region, in which hatched pixels indicate pixels from which pixel signals are to be read out (readout pixels), and white pixels indicate pixels from which pixel signals are not to be read out (non-readout pixels). In FIGS. 3A to 3C, the readout pattern 301 is shown as an example of 5×5 pixels, but the number of pixels of the readout pattern may be arbitrary.

Even in the same low compression region, patterns with low periodicity are set by changing the readout patterns for different divided regions or for each image to be captured as shown as readout patterns 306 and 307.

In addition, the readout pattern 302 shown in FIG. 3B is an example of the readout pattern for the medium compression region, and the readout pattern 303 illustrated in FIG. 3C is an example of the readout pattern for the high compression region. As shown in FIGS. 3A to 3C, the density of the pixels from which pixel signals are read becomes lower in a higher compression region.

As described above, the image capturing apparatus according to the first embodiment outputs from the image sensor 100 a compressed image in which different compression ratios are applied to different regions of the pixel area in accordance with the subject detection result of the subject detection unit 109.

In the first embodiment, three types of regions, namely, the low compression region, the medium compression region, and the high compression region, are set, however the number of types of regions is not limited thereto, and the density of readout pixels for each region may be arbitrarily set. Furthermore, they may be changed according to a shooting mode of the image capturing apparatus such as a full-screen shooting mode, a cropping shooting mode, and so forth.

Next, a method of outputting the compressed image data from the image sensor 100 with the readout patterns shown in FIGS. 3A to 3C will be described.

FIG. 4 is a diagram showing the overall configuration of the image sensor 100. The image sensor 100 includes a pixel area 400, a readout circuit 401, a vertical scanning circuit 402, a horizontal scanning circuit 403, a timing generation circuit (TG) 404, a digital output unit 405, and the readout pattern generation unit 406.

In the pixel area 400, unit pixels 407 are arranged in a matrix. Here, an array of 12×8 pixels is shown in order to simplify the explanation, however, in practice more pixels are arranged. Each pixel is connected to the readout circuit 401 via a vertical signal line 408 for each column. The vertical scanning circuit 402 selects the pixels of the pixel area 400 on a row-by-row basis and sends a driving signal to the pixels of the selected row. The readout circuit 401 includes an amplifier 409 and an analog-digital (AD) conversion circuit 410 provided for each column. The amplifiers 409 amplify pixel signals output from pixels row by row via the vertical signal lines 408. The AD conversion circuit 410 converts the analog pixel signal amplified by the amplifier 409 into a digital signal. The AD conversion circuit 410 is composed of, for example, a comparison circuit and a counter circuit (both not shown). The comparison circuit compares a ramp signal whose voltage value varies along with time with the input pixel signal and sends a signal to the counter circuit at the timing when magnitude relation between them is reversed. The counter circuit receives the signal from the comparison circuit and holds a counted value as a digital signal. Note that the amplifier 409 may be omitted and an analog pixel signal from the unit pixel 407 may be directly input to the AD conversion circuit 410 via the vertical signal line 408.

To the readout pattern generation unit 406, compression parameters including the compression ratio information and the seed value set by the compression parameter setting unit 110 are input. Then, the readout pattern generation unit 406 generates a readout pattern for each line based on the compression parameters. The readout pattern for each row is used in order to output an image signal with a readout pattern as shown in FIGS. 3A to 3C when a readout circuit 401 performs a readout operation for each row.

The digital signal converted by the AD conversion circuit 410 is sequentially output to the digital output unit 405 via a digital output line 411 based on a horizontal scanning pulse from the horizontal scanning circuit 403. Here, the columns to which the horizontal scanning pulse is supplied are only the columns of readout pixels designated by the readout pattern for each row generated by the readout pattern generation unit 406. On the other hand, a power save signal is supplied to the amplifiers 409 and the AD conversion circuits 410 of the columns of non-readout pixels designated by the readout pattern for each row via a power save signal line 412. The power-supply voltage or current to the amplifiers 409 and the AD conversion circuits 410 of the columns to which the power save signal is supplied is stopped, and the amplifiers 409 and the AD conversion circuits 410 enter the power saving state (OFF), and do not output pixel signals. The readout pattern for each row and the power save signal are changed and supplied row by row. Note that the configuration may be such that at least the amplifiers 409 or the AD conversion circuits 410 are set in the power saving state (OFF).

The digital output unit 405 performs correction processing and the like on the digital signal output from the readout circuit 401, and outputs the result to the outside of the image sensor 100. The TG 404 sends control signals to the readout circuit 401, the vertical scanning circuit 402, and the horizontal scanning circuit 403.

FIG. 5 shows the configuration of the readout pattern generation unit 406. The readout pattern generation unit 406 generates a readout pattern based on the compression parameters (compression ratio information and a seed value for each divided region) input from the compression parameter setting unit 110.

The readout pattern generation unit 406 includes a pseudorandom number generator 501 and a threshold comparator 502. The pseudorandom number generator 501 generates a pseudorandom number sequence using a linear congruential method, an Xorshift method, or the like based on a predetermined seed value supplied from the compression parameter setting unit 110. The threshold comparator 502 compares the threshold value, determined according to the compression ratio information of each divided region supplied from the compression parameter setting unit 110, with the pseudorandom number sequence generated by the pseudorandom number generator 501, thereby generates a readout pattern consisting of binary numbers of 0 and 1. Here, 0 indicates a non-readout pixel and 1 indicates a readout pixel.

Figures 6A, 6B, 6C:
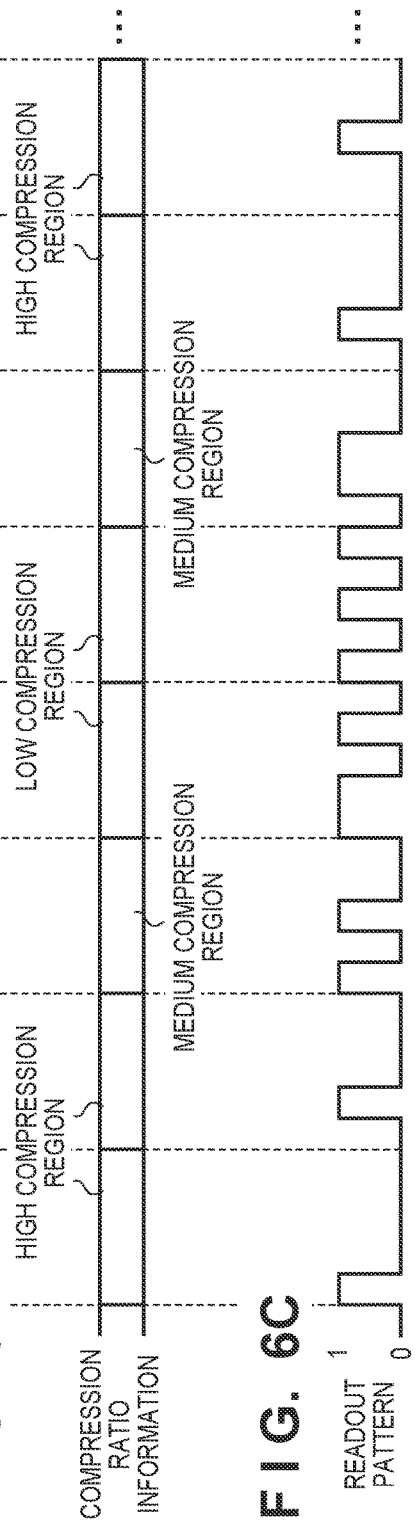
FIGS. 6A to 6C are diagrams for explaining a method of generating a readout pattern for an arbitrary row according to the first embodiment.

FIGS. 6A to 6C show an example of generating a readout pattern for a certain row (for example, one row included in the second divided regions from the top in FIG. 2). FIG. 6A is an example of a pseudorandom number sequence for one row generated by the pseudorandom number generator 501. Here, the generated pseudorandom number sequence is constituted by values of 8 bits (0 to 255), and the horizontal axis indicates pixels of a row to be read out in the column direction. FIG. 6B shows compression ratio information for each divided region set by the compression parameter setting unit 110. An example of the thresholds set in accordance with the compression ratio information and used in the threshold comparator 502 are indicated by broken lines in FIG. 6A.

The threshold comparator 502 compares the pseudorandom number sequence with the threshold values indicated by the broken lines, and sets a readout pattern which becomes 0 (non-readout) when the pseudorandom number is less than the threshold value and 1 (readout) when the pseudorandom number is not less than the threshold value. As shown in FIG. 6A, in the high compression region where the compression ratio is high, the threshold value is increased to decrease the number of the pseudorandom numbers that are equal to or larger than the threshold value, and the threshold value is decreased as the compression ratio becomes lower to increase the number of the pseudo-random numbers that are equal to or larger than the threshold value. An example of the readout pattern thus generated is shown in FIG. 6C. The generation of the readout pattern for one row shown in FIGS. 6A to 6C is performed before the target row is read out. The detail of generation timing of the readout pattern will be described later with reference to FIG. 9.

As described above, by using the pseudorandom number generator 501 for generation of a readout pattern, it is possible to generate and use a pattern having low periodicity, so that it is possible to suppress the occurrence of moiré in a photographed image. Here, when the periodicity of the pseudorandom number sequence generated by the pseudorandom number generator 501 is short, the seed value to be input to the pseudorandom number generator may be set to a different value for each row. In this manner, it is possible to generate a readout pattern with less periodicity.

Also, by using the same pseudorandom number generating circuit and seed value, it is possible to generate the same pseudorandom number sequence. Therefore, it is possible to generate the information of a readout pattern which is necessary for reproducing a compressed image to be described later without recording it.

In the present embodiment, a readout pattern is generated by using the pseudorandom number generator 501. However, a predetermined fixed pattern may be used as long as the fixed pattern has a low periodicity. Further, in the present embodiment, a readout pattern is generated for each row, however a readout pattern may be generated for each predetermined region.

Figure 7:
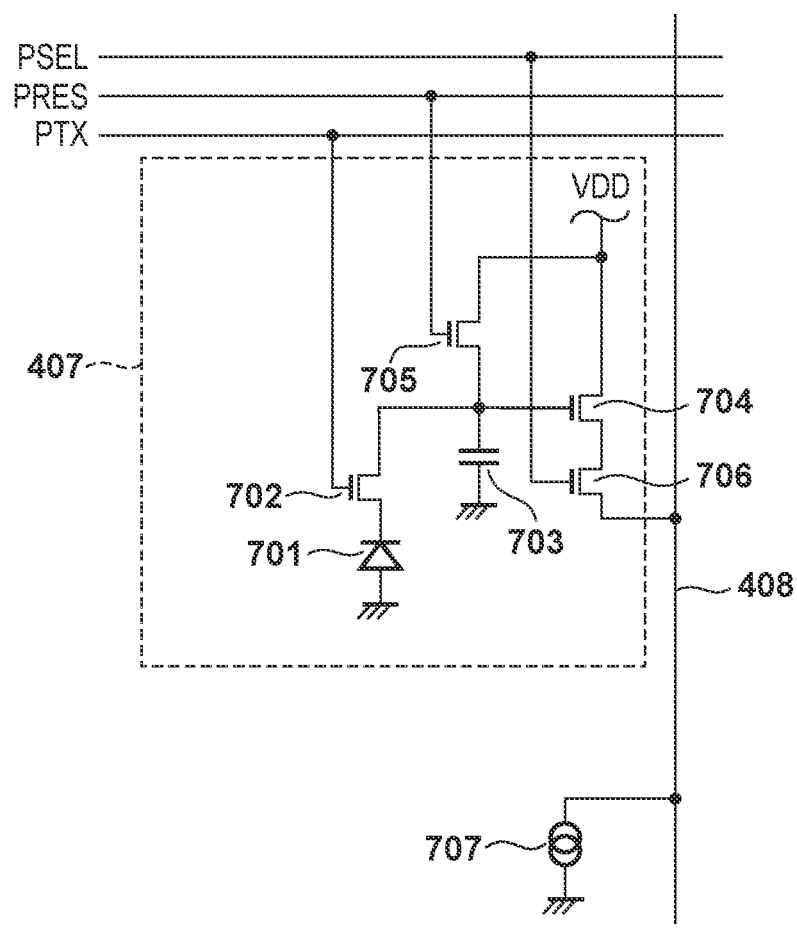
FIG. 7 is a circuit diagram showing an example of a configuration of a unit pixel according to the first embodiment.

FIG. 7 is a circuit diagram showing an example of a configuration of the unit pixel 407. The unit pixel 407 includes a photodiode (PD) 701, a transfer switch 702, a floating diffusion portion (FD) 703, an amplification unit 704, a reset switch 705, and a selection switch 706.

The PD 701 functions as a photoelectric conversion unit that receives the light incident through the photographic lens and generates a signal charge corresponding to the quantity of the received light. The transfer switch 702 is controlled by a transfer pulse signal PTX and transfers the charge generated in the PD 701 to the FD 703. The FD 703 temporarily holds the signal charge transferred from the PD 701 and functions as a charge voltage conversion unit that converts the held charge into a voltage signal. The amplification unit 704 is an amplification transistor, amplifies a voltage signal based on the electric charge held in the FD 703, and outputs the amplified voltage signal as a pixel signal. The amplification transistor forms a source follower with a current source 707 connected to the vertical signal line 408.

The reset switch 705 is controlled by a reset pulse signal PRES and resets the potential of the FD 703 to a reference potential VDD. Further, by simultaneously turning on the transfer pulse signal PTX and the reset pulse signal PRES, it is possible to reset the PD 701 to the reference potential VDD. The selection switch 706 is controlled by a vertical selection pulse signal PSEL and outputs the pixel signal amplified by the amplification unit 704 to the vertical signal line 408.

Figure 8:
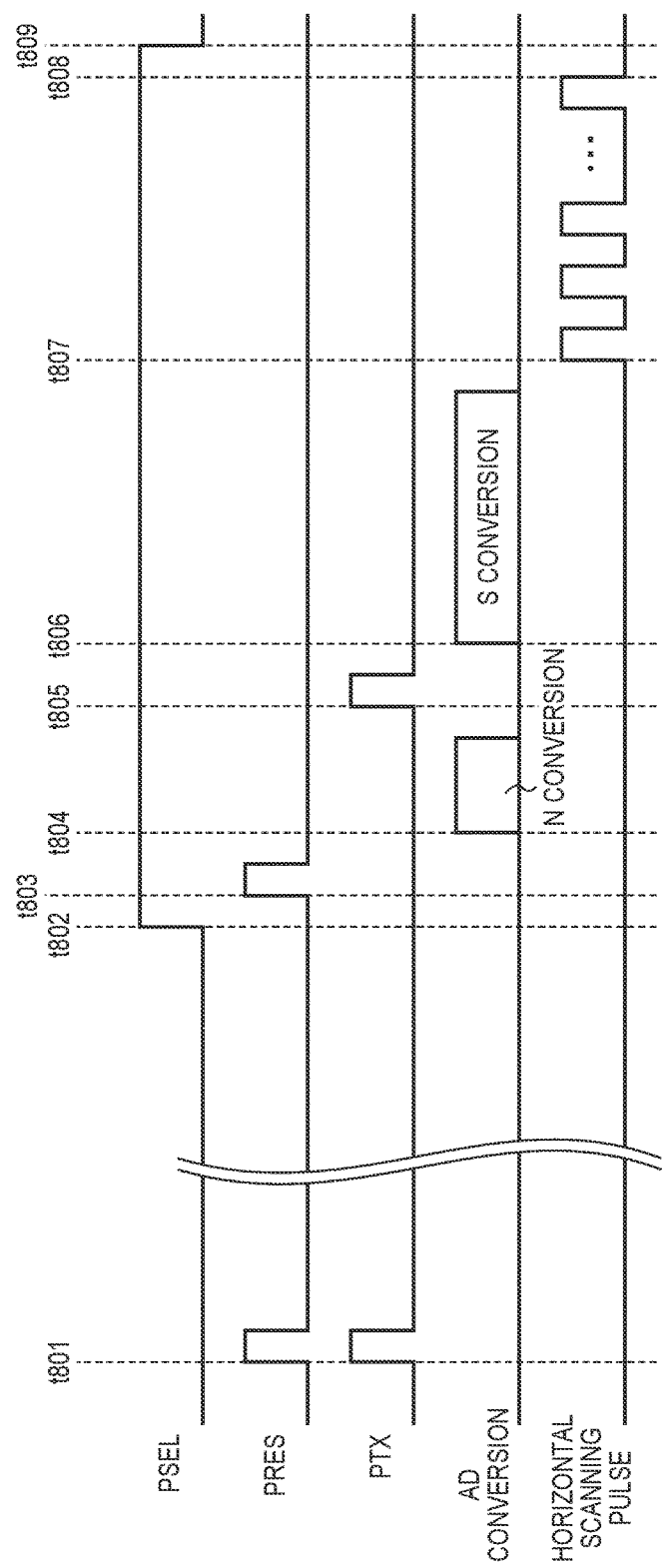
FIG. 8 is a timing chart at reset and readout timings according to the first embodiment.

Next, a method of driving the image sensor 100 according to the first embodiment will be described. FIG. 8 is a timing chart at the time of resetting and reading when the vertical scanning circuit 402 selects a certain row. When each control signal is at the H level, the corresponding switch in FIG. 7 is turned on.

At time t801, the reset pulse signal PRES and the transfer pulse signal PTX become H, and the transfer switch 702 and the reset switch 705 are turned on. As a result, the PD 701 is reset through the reset switch 705 and the transfer switch 702. Thereafter, the accumulation operation starts from the time when the transfer pulse signal PTX becomes L, and in the PD 701, signal charges generated according to the amount of received light are accumulated. Also, reset pulse signal PRES is also controlled to L.

After a predetermined accumulation period has elapsed, the vertical selection pulse signal PSEL of the selected row becomes H at time t802, the selection switches 706 of the pixel in the selected row are turned on, and the pixels of the selected row are connected to the vertical signal lines 408. Next, at time t803, the reset pulse signal PRES becomes H, the reset switch 705 of each of the pixels in the selected row turns on, and the FD 703 becomes the reset level. At this time, the pixel signal output to the vertical signal line 408 is a reset level signal, which is referred to as an N signal.

At time t804, the N signal output to the vertical signal line 408 is amplified by the amplifier 409 and input to the AD conversion circuit 410. Then, the N signal is converted into a digital signal and held in the AD conversion circuit 410. The operation of converting the N signal into a digital signal performed at time t804 is referred to as "N conversion". Here, the above-described N conversion is performed only on the columns of the readout pixels in the readout pattern generated by the readout pattern generation unit 406. In the column of the non-readout pixels, the power save signal is supplied to the amplifiers 409 and the AD conversion circuits 410, and the power saving state is set and the N conversion is not performed.

Next, at time t805, the transfer pulse signal PTX is set to H. As a result, the transfer switch 702 of each of the pixels in the selected row is turned on, and the signal charge generated by the photoelectric conversion in the PD 701 is transferred to the FD 703. A signal corresponding to the charge amount generated in the PD 701 is outputted to the vertical signal line 408. This is called an S signal.

At time t806, the S signal output to the vertical signal line 408 is amplified by the amplifier 409 and input to the AD conversion circuit 410. The S signal is converted into a digital signal and held in the AD conversion circuit 410 together with the previously held N signal. The operation of converting the S signal into a digital signal performed at time t806 is called "S conversion". Here, the above-mentioned S conversion is performed only on the columns of the readout pixels in the readout pattern generated by the readout pattern generation unit 406. In the columns of the non-readout pixels, the power save signal is supplied to the amplifiers 409 and the AD conversion circuits 410, and the power saving state is set, and the S conversion is not performed.

Next, from time t807 to t808, a horizontal scanning pulse is sent from the horizontal scanning circuit 403 to the columns designated as readout pixels in the readout pattern generated by the readout pattern generation unit 406. As a result, the digital S signal and N signal held in the AD conversion circuits 410 of the columns of the readout pixels are sequentially output to the digital output unit 405 column by column. By repeating this horizontal scanning up to the last column, the output of the S signal and N signal of the selected row is completed. Then, in the digital output unit 405, processing for subtracting the N signal from the corresponding S signal is performed and the result is output to the outside of the image sensor 100. By this subtraction processing, it is possible to obtain an S signal from which the fixed pattern noise has been removed.

Figure 9:
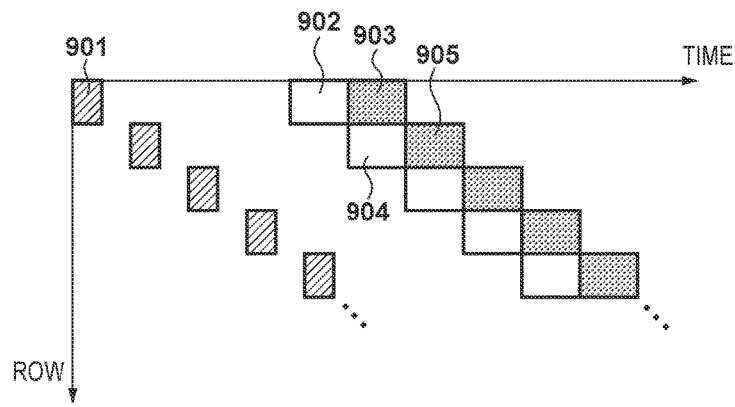
FIG. 9 is a diagram showing timing of resetting and reading out each row and timing of generating a readout pattern according to the first embodiment.

FIG. 9 shows the timing of reset and readout of respective rows and the timing of generation of the readout patterns. A period 901 represents the timing at which the reset operation at t801 in FIG. 8 is performed. A period 903 represents the timing of performing the readout operation indicated by the period between t802 and t809 in FIG. 8. A period 902 represents a timing of generating a readout pattern of a row to be read out by the readout pattern generation unit 406. Immediately before reading out the target row as shown by the period 903, generation of the readout pattern is performed as shown by the period 902. While the readout operation is being performed in the period 903, a readout pattern for the next row is generated as shown by a period 904. Then, the readout pattern to be supplied to the horizontal scanning circuit 403 is updated at the timing of starting the readout operation of the next row as indicated by the period 905. By repeating this operation until the last row, readout of all the rows is completed.

Figure 10:
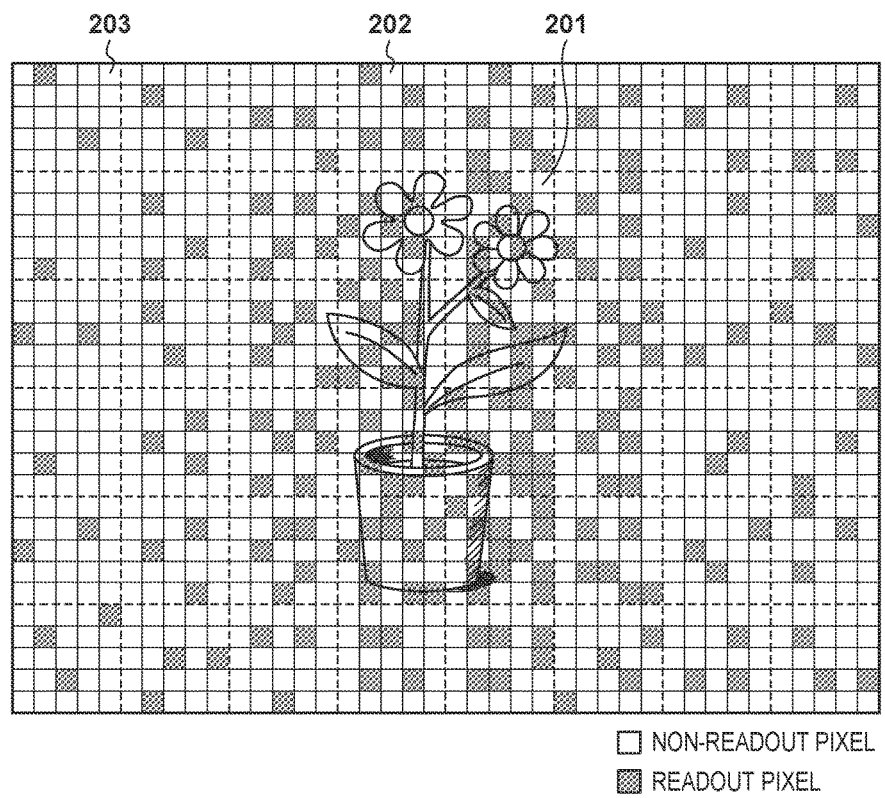
FIG. 10 is a diagram showing an example of correspondence between readout pixels and non-readout pixels of the image sensor, and an image according to the first embodiment.

FIG. 10 shows an example of compressed image data output from the image sensor 100 by the driving method described above with reference to FIGS. 8 and 9. FIG. 10 shows an example of compressed image data outputted using the compression ratio information based on the subject detection result shown in FIG. 2. In a region 201 (low compression region) where a subject image is detected, the density of pixels for outputting a pixel signal is high, and in a region 203 (high compression region) where a subject image is not detected, the density of pixels for outputting a pixel signal is low. In the medium compression region 202, a pixel signal is output at a density intermediate between the low compression region and the high compression region.

This compressed image data is temporarily stored in the memory unit 105, and after being subjected to interpolation processing and development processing in the overall control/operation unit 104, it is used for display by the display unit 106, or recorded in a nonvolatile memory by the recording unit 107, and so forth. When storing the compressed image data in the memory unit 105, address information of each pixel signal is required. To that end, the same readout pattern generation unit as the readout pattern generation unit 406 in the image sensor 100 may be also provided in the overall control/operation unit 104. Therefore, by using the compression parameters (compression ratio information and seed value) used in shooting processing of the compressed image data, the same readout pattern as that used at the time of photographing is generated, whereby address information of each pixel signal can be obtained.

As described above, by setting the region where the subject image is not detected as the high compression region to decrease the density of the readout pixels and increase the ratio of the pixels of which the power saving of the amplifiers 409 and the AD conversion circuits 410 at the time of readout operation is performed, the consumption of electric power can be suppressed. Further, by setting the region where the subject image is detected as the low compression region to increase the density of the readout pixels, deterioration of image quality can be suppressed.

Next, a method of acquiring compressed image data as shown in FIG. 10 over a plurality of frames and generating a restored image from the compressed image data will be described. Here, the restored image refers to image data corresponding to the case of outputting signals of all the pixels of the image sensor 100.

Figure 11:
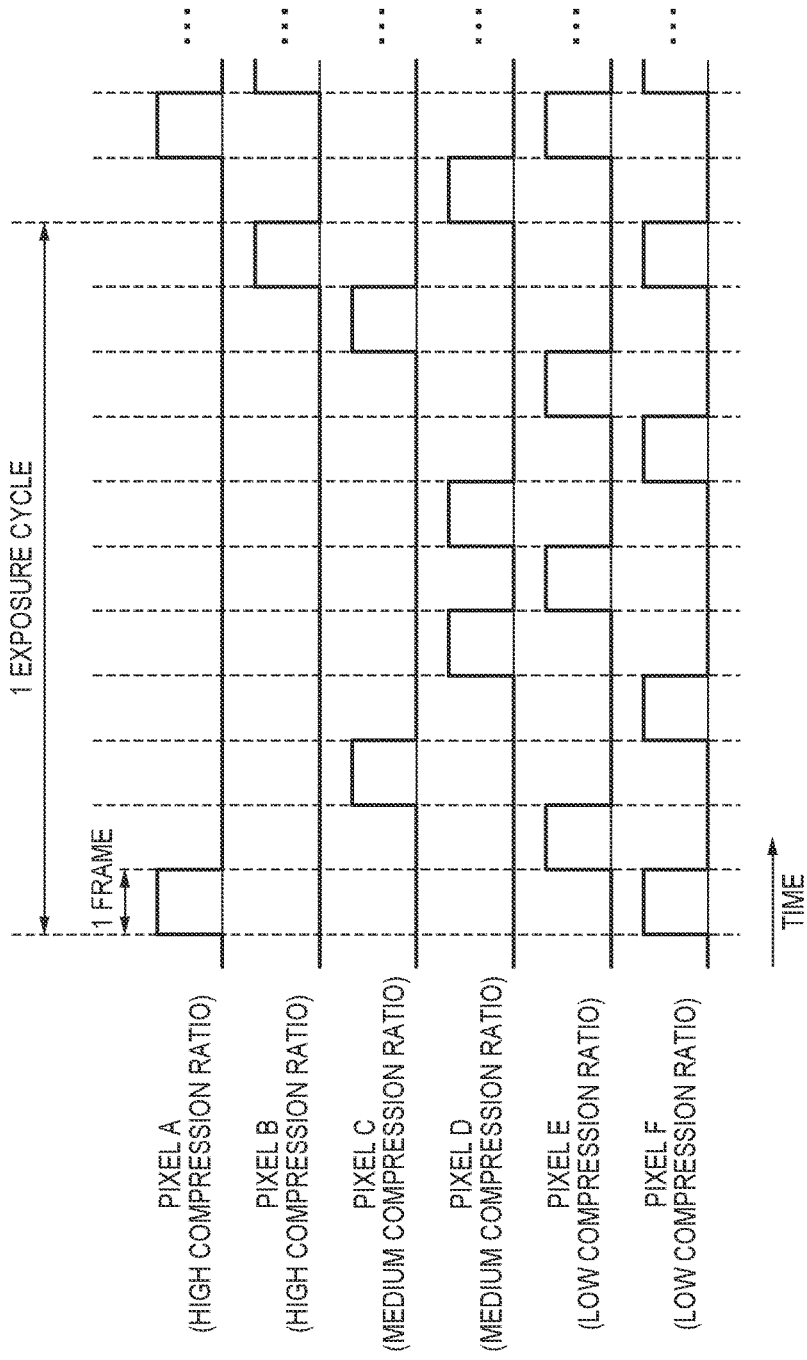
FIG. 11 is a diagram showing an example that from which frame each pixel is read out in a case where images of multiple frames are captured according to the first embodiment.

FIG. 11 is a view showing an example of the frame in which the signal of each pixel is read out when image capturing of a plurality of frames is performed by the driving method described in FIGS. 8 and 9, and six pixels A to F are shown as the example. In FIG. 11, pixels A and B are in the high compression region, pixels C and D are in the medium compression regions, and pixels E and F are in the low compression region. The compression ratio of each region may be changed in the middle of the plurality of frames in accordance with the subject detection result.

As shown in FIG. 11, by performing the readout operation of a plurality of frames using readout patterns with less periodicity, a readout pattern of each pixel becomes less periodical in the time axis direction. Here, the period during which all pixels are read at least once is referred to as "one exposure cycle". The memory unit 105 holds compressed image data for one exposure cycle. In addition, when pixel signals are read out plural times from the same pixel within one exposure cycle, these signals are added and held in the memory unit 105.

Here, let I(x, y) be the compressed image data of one exposure cycle held in the memory unit 105, S(x, y, t) the readout pattern for one exposure cycle, and E(x, y, t) a restored image. Also, x and y represent horizontal and vertical pixel addresses, respectively, and t represents a frame number. At this time, these values have the relationship shown in the following expression (1).

$$I(x,y) = \sum_{t=1}^{N} S(x,y,t) E(x,y,t) \quad (1)$$

Here, the restored image E can be obtained by calculating the above equation. Therefore, from the compressed image data for one exposure cycle, a restored image corresponding to the signals of all the pixels can be obtained over a plurality of frames. Therefore, the shooting and restoration processing is suitable for moving image shooting. The above restoration processing is performed by the overall control/operation unit 104.

Figure 12:
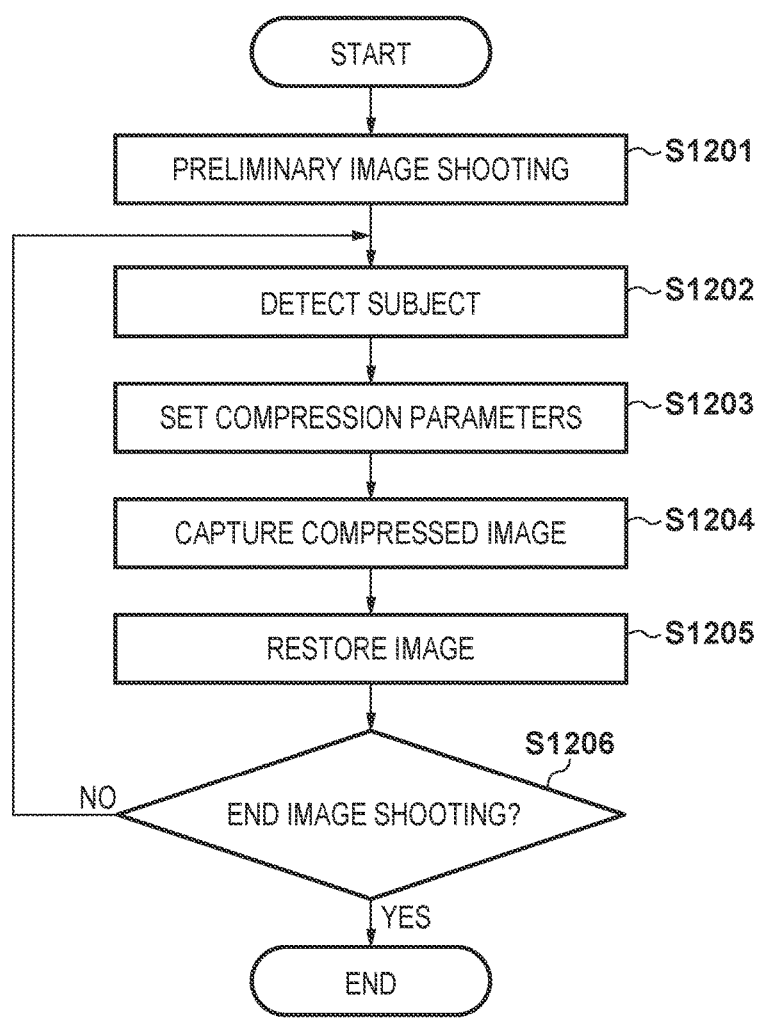
FIG. 12 is a flowchart for explaining a flow of processing at the time of moving image shooting by the image capturing apparatus according to the first embodiment.

Next, with reference to a flowchart of FIG. 12, a flow of control at the time of moving image shooting by the image capturing apparatus in the first embodiment will be described. First, in step S1201, image data used for subject detection is acquired. Here, the image sensor 100 outputs an image signal with a predetermined readout pattern from the image sensor 100 and stores it in the memory unit 105. Note that in step S1201, the pixel signals may be output from all the pixels of the image sensor 100.

In step S1202, the subject detection unit 109 detects the subject image using the image data acquired in step S1201. When restoring of the compressed image is performed in S1205 described later, the subject image is detected using the restored image data. In S1203, the compression parameters are set in the compression parameter setting unit 110 based on the subject detection result in S1202. In S1204, compressed image data is output from the image sensor 100 by using the compression parameters set in S1203. Here, compressed image data for one exposure cycle is acquired and stored in the memory unit 105. In S1205, the overall control/operation unit 104 generates restored image data from the compressed image for one exposure cycle acquired in S1204. In step S1206, it is determined whether the image shooting is ended, and in the case of continuing the image shooting, the process returns to step S1202.

As described above, by setting the region where the subject image is not detected as the high compression region to decrease the density of the readout pixels and increase the ratio of the pixels of which the power saving of amplifiers and AD conversion circuits at the time of readout operation is performed, the consumption of electric power can be suppressed. Further, by setting the region where the subject image is detected as the low compression region to increase the density of the readout pixels, deterioration of image quality can be suppressed. In this manner, by changing the compression ratio for each divided region, it is possible to effectively reduce the power consumption while suppressing degradation of image quality.

Figure 13:
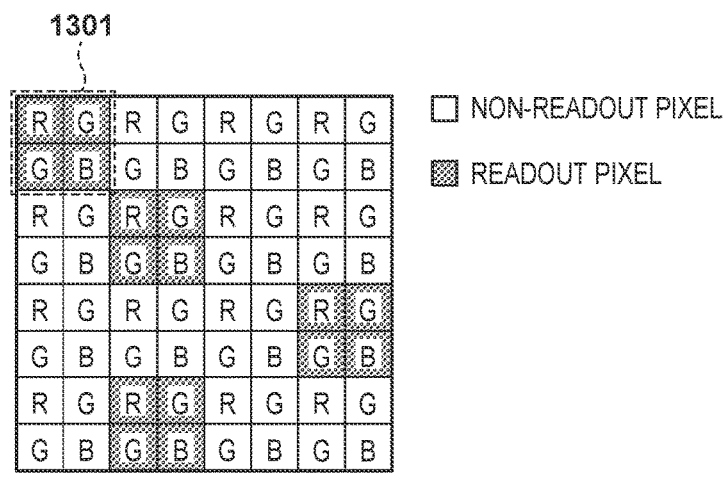
FIG. 13 is a diagram showing another example of a readout pattern according to the first embodiment.

In the first embodiment, an example in which compressed image data is acquired using readout patterns with less periodicity for each pixel as shown in FIGS. 3A to 3C has been described. When the image sensor 100 is provided with a color filter of the Bayer arrangement (color array) made up of three colors of red (R), green (G), and blue (B), readout patterns with less periodicity may be generated while taking four pixels of the Bayer arrangement shown by a frame 1301 in FIG. 13 as a unit. By using the readout pattern in units of color array as shown in FIG. 13, even when the subject moves during shooting, occurrence of false color can be suppressed.

Second Embodiment

Next, a second embodiment of the present invention will be described. In the first embodiment, the configuration in which pixel signals are sequentially read out row by row and subjected to AD conversion using the image sensor 100 including the amplifier 409 and the AD conversion circuit 410 for each column has been described. On the other hand, in the second embodiment, a configuration in which each pixel is provided with an amplifier and an AD conversion circuit will be described. In the configuration according to the second embodiment, pixel signals can be simultaneously read out from all pixels and subjected to AD conversion, so that higher-speed readout becomes possible.

Figure 14:
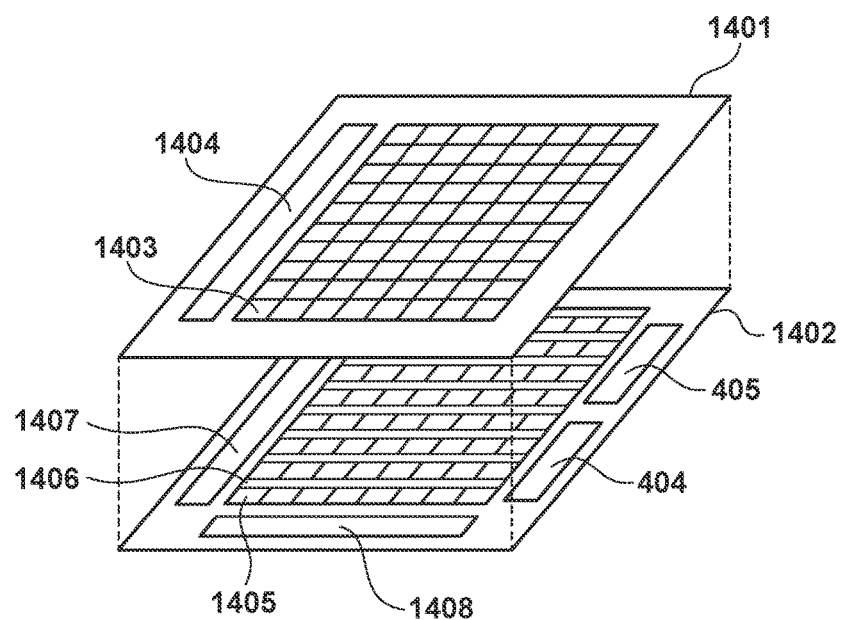
FIG. 14 is a diagram showing a configuration of an image sensor according to a second embodiment.

FIG. 14 is a diagram showing a configuration of the image sensor 100 in the second embodiment. Since the configuration other than the image sensor is the same as that of the first embodiment, the description thereof will be omitted. In FIG. 14, the same constituents as those in FIG. 4 described in the first embodiment are denoted by the same reference numerals, and a detailed description thereof will be omitted.

The image sensor 100 in the second embodiment has a configuration in which a pixel area substrate 1401 and a readout circuit substrate 1402 are stacked on each other. Wirings between the respective substrates are electrically connected by using silicon penetrating electrodes or the like.

The pixel area substrate 1401 includes a pixel area in which unit pixels 1403 are arranged in a matrix and a pixel driving circuit 1404. The pixel driving circuit 1404 collectively outputs drive signals to all the pixels in the pixel area.

The readout circuit substrate 1402 includes a TG 404, a digital output unit 405, a vertical selection circuit 1407, a horizontal selection circuit 1408, a readout circuits 1405, and readout pattern generation units 1406. One readout circuit 1405 is provided for each unit pixel. Also, one readout pattern generation unit 1406 is provided for every readout circuits of one row. However, the configurations of the readout circuits 1405 and the readout pattern generation units 1406 are not limited to this. For example, each readout circuit 1405 may be shared by plural unit pixels. Further, each readout pattern generation unit 1406 may be provided for a plurality of rows, or for each pixel. The combination of selections by the vertical selection circuit 1407 and the horizontal selection circuit 1408 select one readout circuit, and the image signal held in the selected readout circuit is output to the digital output unit 405.

Figure 15:
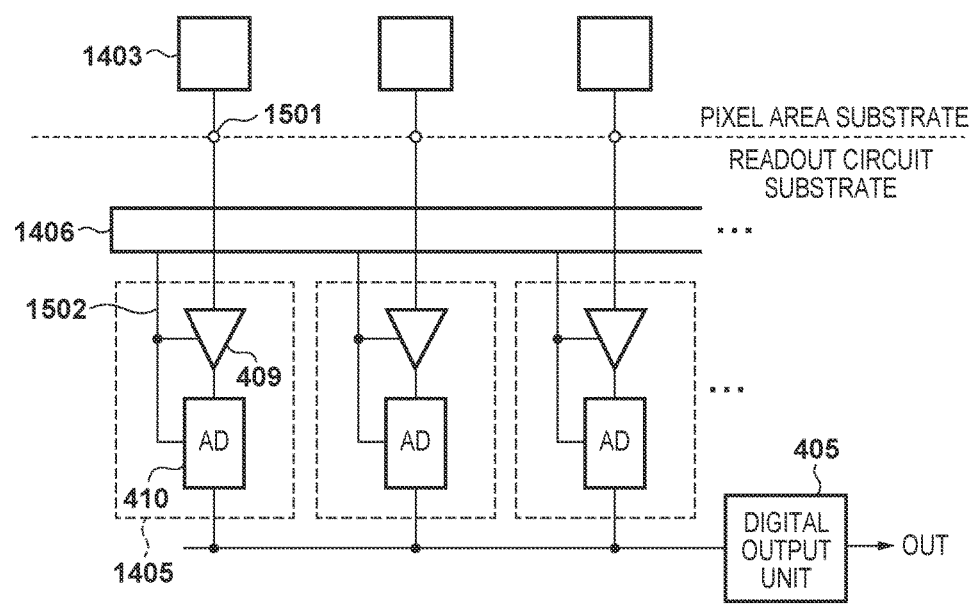
FIG. 15 is a diagram for explaining relationship between a unit pixel and a readout circuit according to the second embodiment.

FIG. 15 is a diagram for explaining the relationship between the unit pixel 1403 and the readout circuit 1405. The unit pixel 1403 formed in the pixel area substrate 1401 is connected to the readout circuit 1405 formed in the readout circuit substrate 1402 via a silicon through electrode 1501. Since the unit pixel 1403 has a configuration in which the selection switch 706 is removed from the unit pixel 407 shown in FIG. 7, a detailed description thereof will be omitted. The readout circuit 1405 includes an amplifier 409 and an AD conversion circuit 410. The readout pattern generation unit 1406 generates a readout pattern based on the compression parameters from the compression parameter setting unit 110 as in the first embodiment. Based on the generated readout pattern, the readout pattern generation unit 1406 supplies a power save signal to the amplifier 409 and the AD conversion circuit 410 of the readout circuit 1405 connected to the non-readout pixel through a power save signal line 1502. At this time, the readout circuit 1405 to which the power save signal is supplied becomes the power saving state, and no pixel signal is outputted.

In the second embodiment, the readout circuit 1405 is provided for each unit pixel 1403, however, as shown in FIG. 14, by forming the pixel area and the readout circuit 1405 on different substrates, it is possible to secure the area of the PD 701. As a result, it is possible to prevent the aperture ratio of the pixel from lowering.

The drive timing of the image capturing apparatus of the second embodiment is such that the drive timing performed row by row shown in FIG. 8 in the first embodiment is simultaneously applied to all rows, so a detailed description thereof will be omitted.

According to the second embodiment as described above, in addition to the same effects as those of the first embodiment, faster readout becomes possible.

Third Embodiment

Next, a third embodiment of the present invention will be described. In the first embodiment described above, a subject is detected from the image data using the subject detection unit 109, and the compression ratio of the image data is changed for each divided region according to the presence or absence of the subject. On the other hand, in the third embodiment, motion information of a subject is detected using a moving body detection unit 1601, and the compression ratio of the image data is changed for each divided region according to the moving body detection result.

Figure 16:
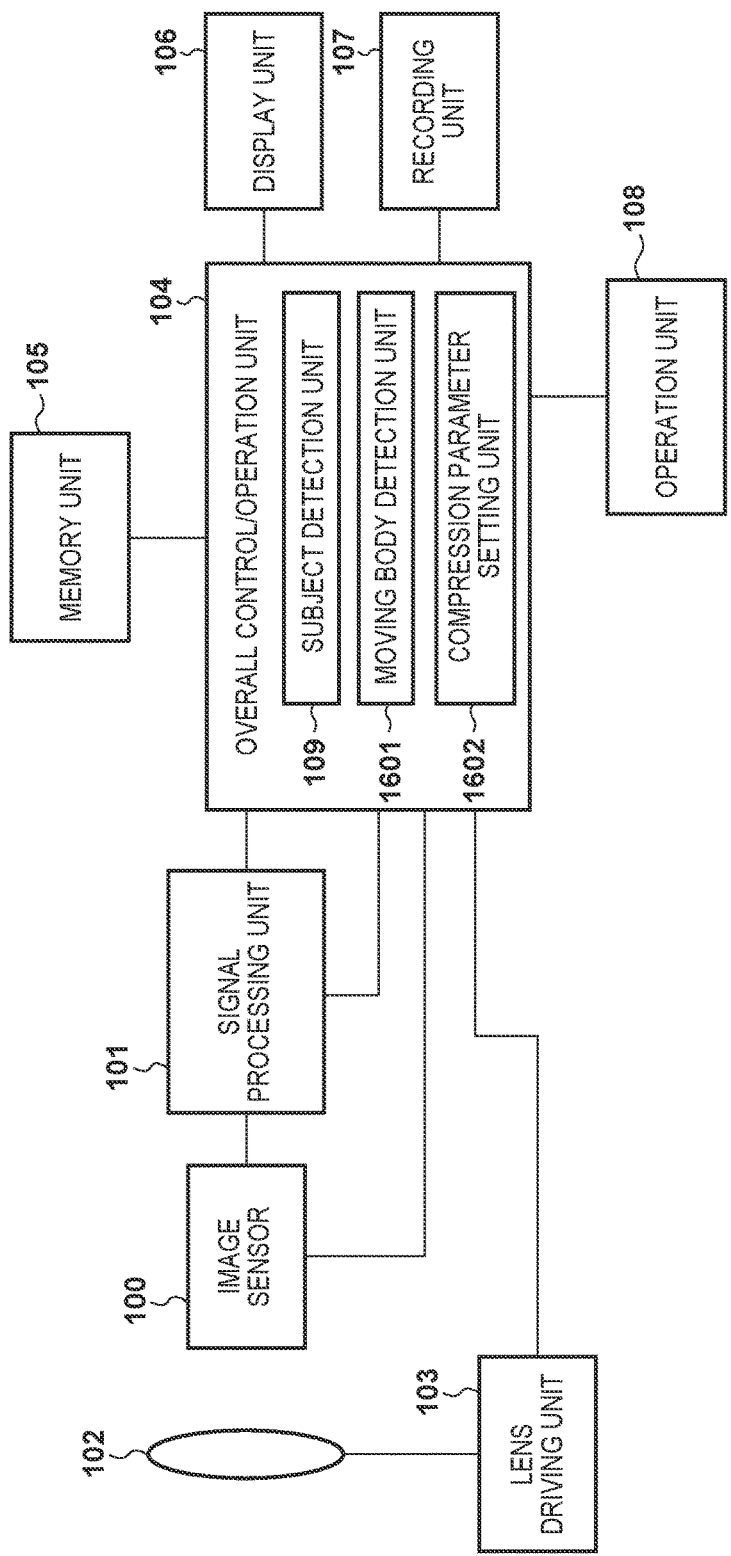
FIG. 16 is a block diagram showing an overall configuration of an image capturing apparatus according to a third embodiment.

FIG. 16 is a block diagram showing an overall configuration of the image capturing apparatus according to the third embodiment. In FIG. 16, the same reference numerals are given to the same configurations as those in FIG. 1 described in the first embodiment, and the description thereof will be omitted. An overall control/operation unit 104 in the third embodiment includes the moving body detection unit 1601 and a compression parameter setting unit 1602. The moving body detection unit 1601 detects a change in the subject detected by a subject detection unit 109, and detects a changed subject as a moving body. Then, the compression parameter setting unit 1602 sets compression parameters according to the moving body detection result of the moving body detection unit 1601.

Figure 17:
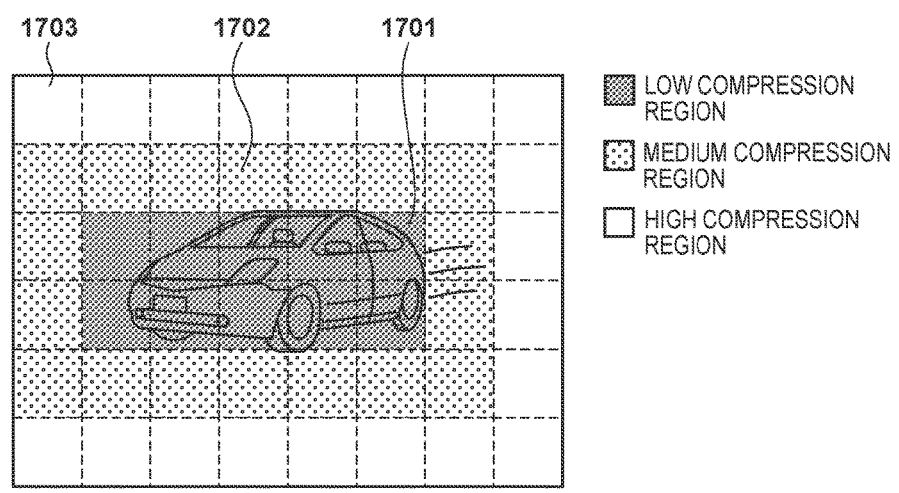
FIG. 17 is a diagram showing an example of setting of a compression ratio by a compression parameter setting unit according to the third embodiment.

FIG. 17 shows an example in which compression ratio information is set in the compression parameter setting unit 1602 according to the moving body detection result. A moving body detection region and the region 1701 located in the moving direction of the moving body detection region are set to the low compression region. The region 1703 in which no moving body was detected is set to the high compression region. Further, among the regions in which no moving object was detected, a region 1702 close to the low compression region is set to the medium compression region. Then, in the same way as in the first embodiment, pixel signals are output from the divided regions of the image sensor 100 with the readout patterns as shown in FIGS. 3A to 3C in accordance with the compression ratio information.

Figure 18:
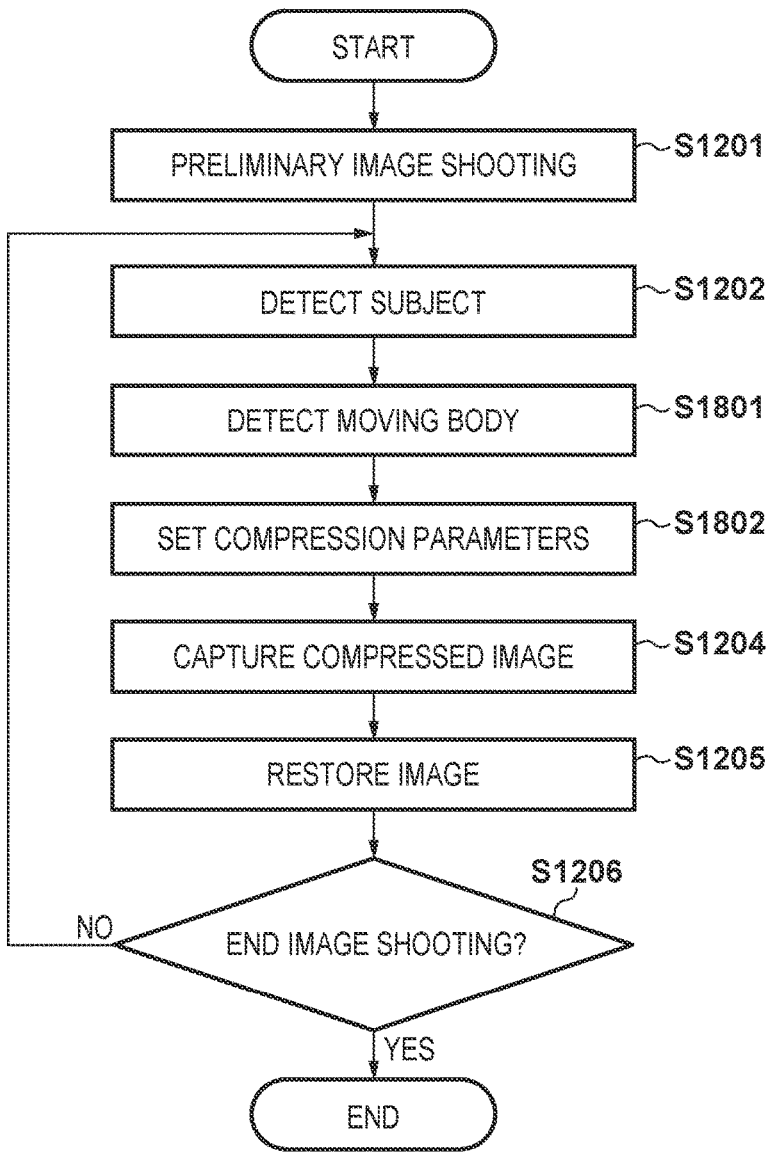
FIG. 18 is a flowchart for explaining a flow of processing at the time of moving image shooting by the image capturing apparatus according to the third embodiment.

FIG. 18 is a flowchart for explaining a flow of processing at the time of moving image shooting in the image capturing apparatus of the third embodiment. In FIG. 18, the same steps as those in FIG. 12 described in the first embodiment are denoted by the same step numbers, and a description thereof will be omitted. In step S1801, the moving body detection unit 1601 compares the subject detected in step S1202 over a plurality of frames, and detects a change in the subject. Then, the subject with a change is detected as a moving body. In 51802, compression parameters are set according to the moving body detection result in S1801. Then, using this compression parameters, compressed image data is output from the image sensor 100 in S1204.

According to the third embodiment as described above, in the divided region where the moving body is detected, the compression ratio is set low to increase the density of the readout pixels, and in the divided regions where the moving object is not detected, the compression ratio is set high to decrease the density of the readout pixels. As a result, it is possible to effectively reduce the power consumption while suppressing degradation of image quality.

Fourth Embodiment

Next, a fourth embodiment of the present invention will be described. In the fourth embodiment, a configuration in which frequency information of a subject is detected from a captured image and a compression ratio for each divided region is set according to the frequency will be described.

Figure 19:
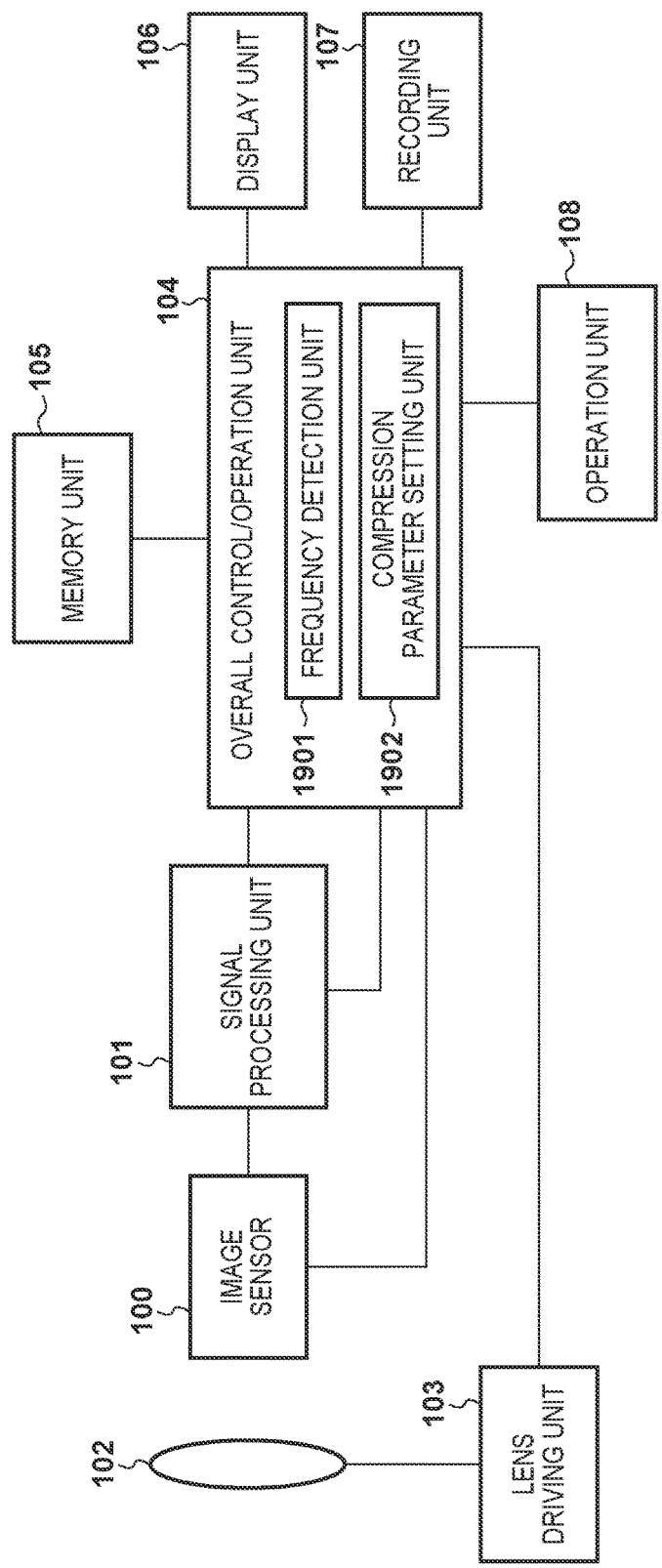
FIG. 19 is a block diagram showing an overall configuration of an image capturing apparatus according to a fourth embodiment.

FIG. 19 is a block diagram showing an overall configuration of an image capturing apparatus according to the fourth embodiment. In FIG. 19, the same reference numerals are given to the same configurations as those in FIG. 1 described in the first embodiment, and the description thereof will be omitted. An overall control/operation unit 104 in the fourth embodiment includes a frequency detection unit 1901 and a compression parameter setting unit 1902. The frequency detection unit 1901 converts an image signal into a frequency domain using discrete Fourier transform, discrete cosine transformation, or the like, and detects the frequency of each region. Then, the compression parameter setting unit 1902 sets compression parameters according to the frequency detection result of the frequency detection unit 1901.

Figure 20:
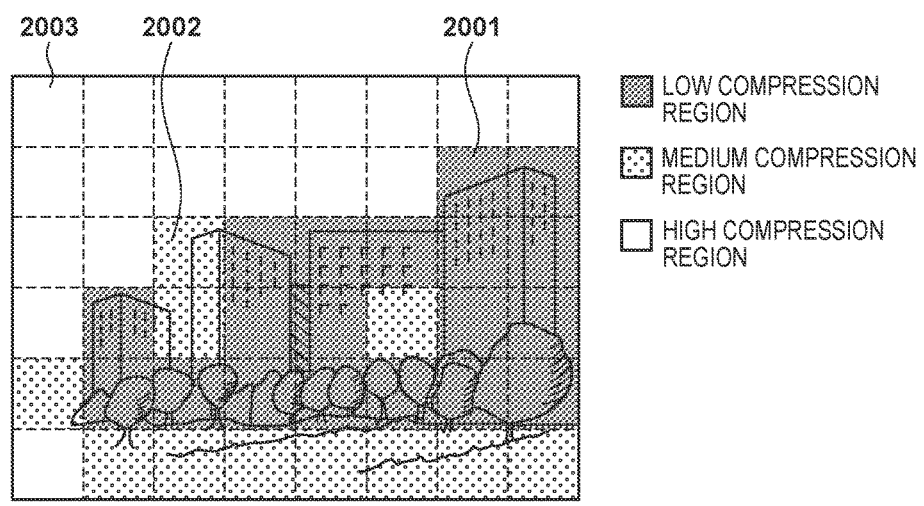
FIG. 20 is a diagram showing an example of setting of a compression ratio by a compression parameter setting unit according to the fourth embodiment.

FIG. 20 shows an example in which compression ratio information is set in the compression parameter setting unit 1902 according to the frequency detection result. A region 2001 including a high frequency component is set to the low compression region. A region 2003 not including high frequency components is set to the high compression region. Further, a region 2002 including the intermediate frequency component between the two is set to the medium compression region. Then, in the same way as in the first embodiment, pixel signals are output from the divided regions of the image sensor 100 with the readout patterns as shown in FIGS. 3A to 3C in accordance with the compression ratio information.

Figure 21:
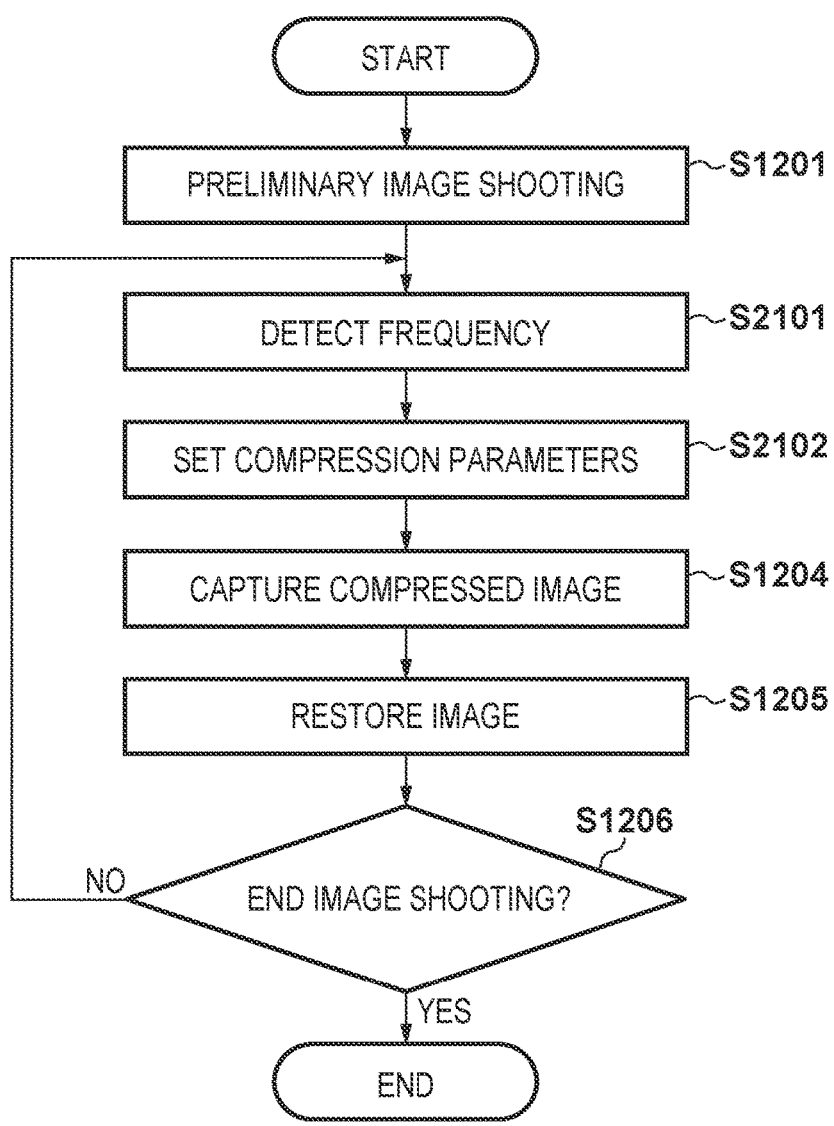
FIG. 21 is a flowchart for explaining a flow of processing at the time of moving image shooting by the image capturing apparatus according to the fourth embodiment.

FIG. 21 is a flowchart for explaining a control flow of the image capturing apparatus in the fourth embodiment. In FIG. 21, the same steps as those in FIG. 12 described in the first embodiment are denoted by the same step numbers, and a description thereof will be omitted. In S2101, the frequency detection unit 1901 converts an image signal into the frequency domain using discrete Fourier transform, discrete cosine transformation, or the like, and detects the frequency for each divided region. In 52102, compression parameters are set according to the frequency detection result in S2101. Then, in S1204, compressed image data is output from the image sensor 100 using the compression parameters.

According to the fourth embodiment as explained above, the compression ratio is set lower in the divided region including the high frequency component to increase the density of the readout pixels, and the compression ratio is set higher in the divided regions not including the high frequency component to decrease the density of the readout pixels. As a result, it is possible to effectively reduce the power consumption while suppressing degradation of image quality.

Fifth Embodiment

Next, a fifth embodiment of the present invention will be described. In the fifth embodiment, a configuration in which a focus state of a subject is detected by a focus detection unit 2201 and a compression ratio for each divided region is set according to the focus detection result will be described.

Figure 22:
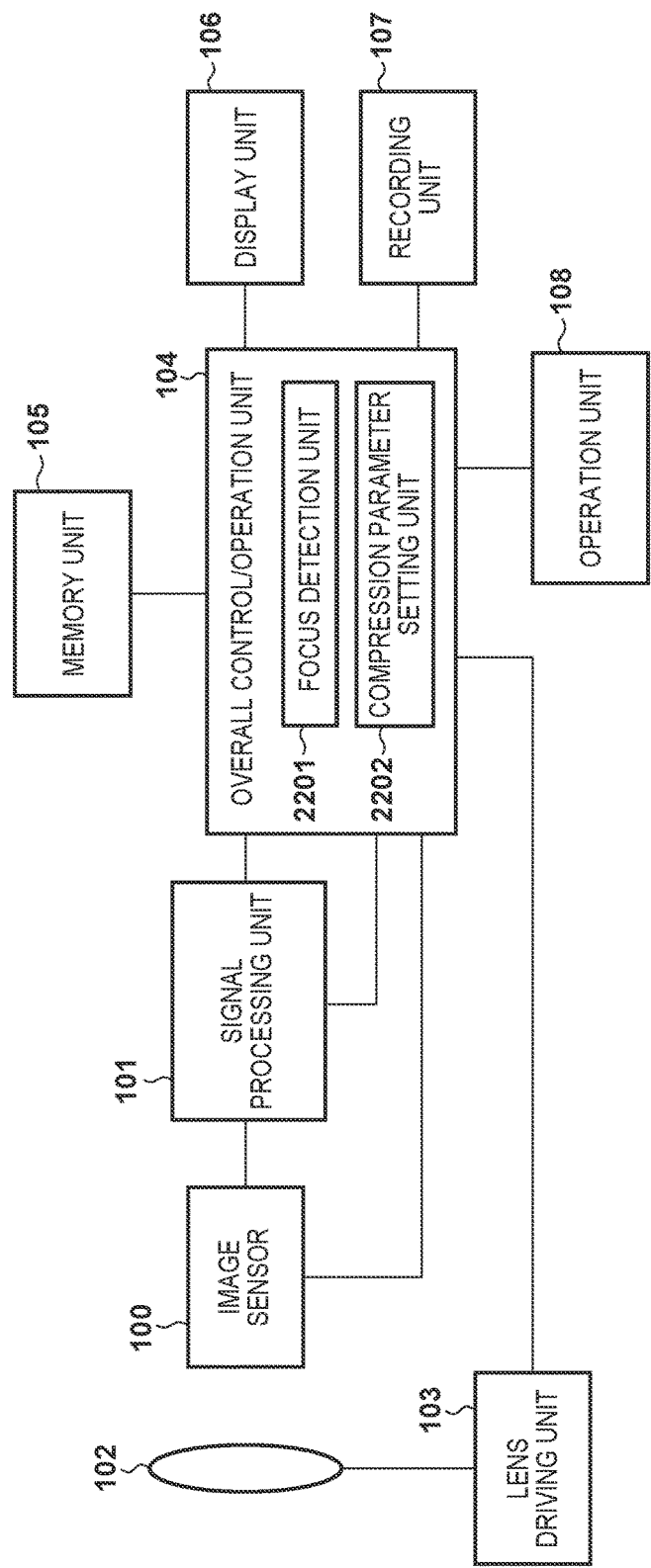
FIG. 22 is a block diagram showing an overall configuration of an image capturing apparatus according to a fifth embodiment.

FIG. 22 is a block diagram showing an overall configuration of an image capturing apparatus in the fifth embodiment. In FIG. 22, the same reference numerals are given to the same components as those in FIG. 1 described in the first embodiment, and the description thereof is omitted. An overall control/operation unit 104 in the fifth embodiment includes the focus detection unit 2201 and a compression parameter setting unit 2202. The focus detection unit 2201 detects the focal position of a subject image using a phase difference detection method or the like using signals of focus detection pixels (not shown) provided in the image sensor 100. Then, the compression parameter setting unit 2202 sets compression parameters according to the focus detection result of the focus detection unit 2201.

Figure 23:
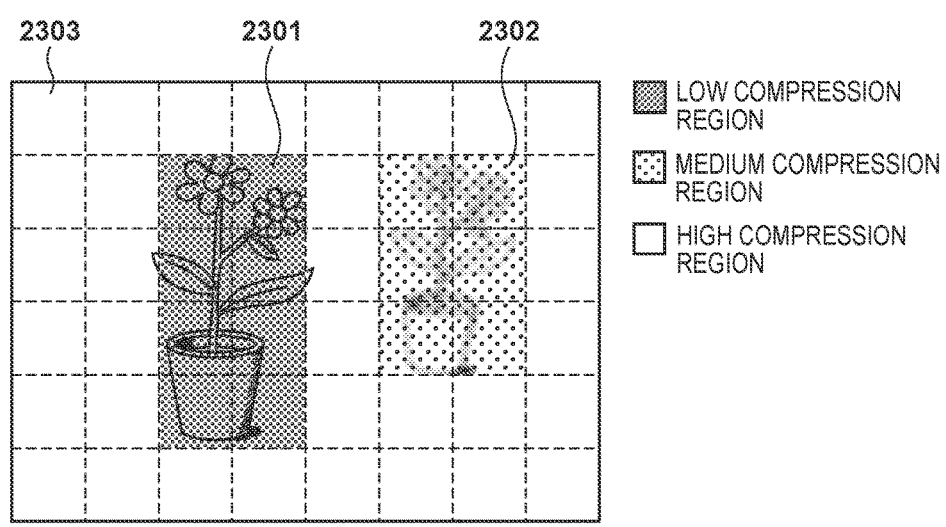
FIG. 23 is a diagram showing an example of setting of a compression ratio by a compression parameter setting unit according to the fifth embodiment.

FIG. 23 shows an example in which compression ratio information is set in the compression parameter setting unit 2202 according to the focus detection result. An in-focus region 2301 is set to the low compression region. On the other hand, non-focused regions are set to the medium compression region 2302 and the high compression region 2303 depending on the defocus amount. Then, in the same way as in the first embodiment, pixel signals are output from the divided regions of the image sensor 100 with the readout patterns as shown in FIGS. 3A to 3C in accordance with the compression ratio information.

Figure 24:
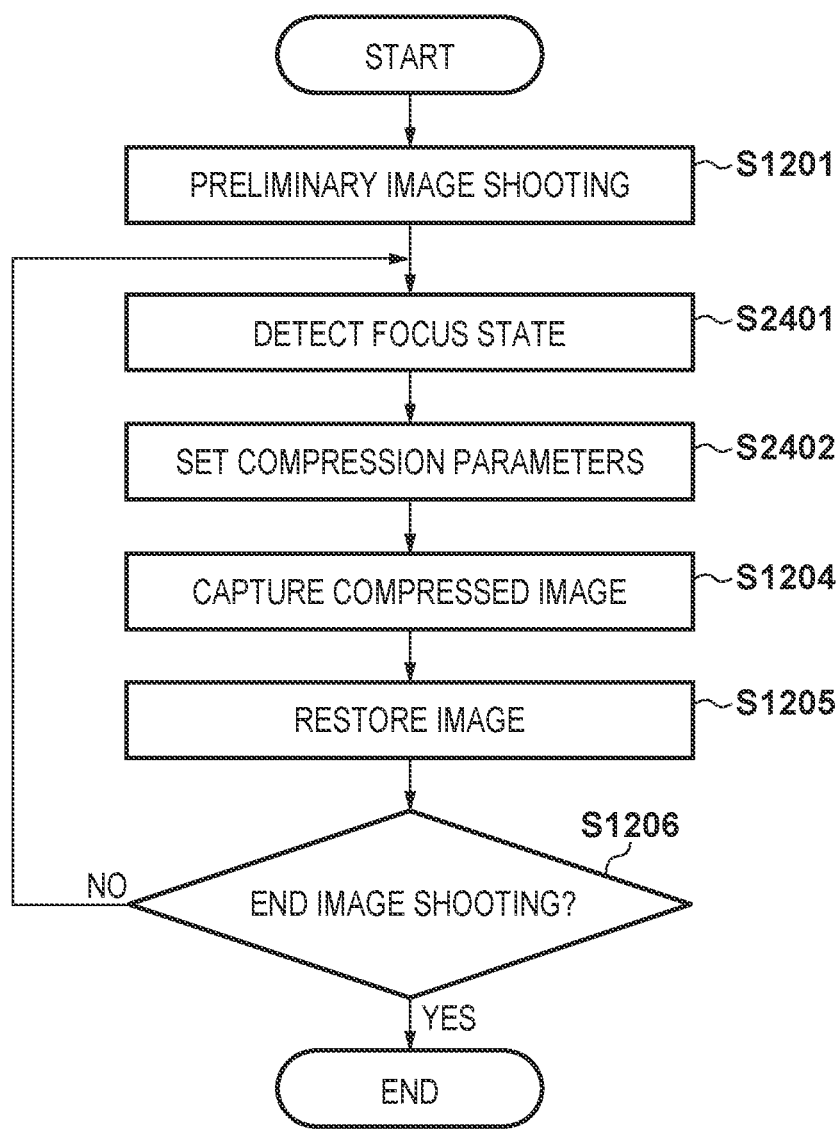
FIG. 24 is a flowchart for explaining a flow of processing at the time of moving image shooting by the image capturing apparatus according to the fifth embodiment.

FIG. 24 is a flowchart for explaining a flow of processing at the time of moving image shooting in the image capturing apparatus of the fifth embodiment. In FIG. 24, the same steps as those in FIG. 12 described in the first embodiment are denoted by the same step numbers, and a description thereof will be omitted. In S2401, the focus detection unit 2201 performs focus detection of the subject image using a phase difference detection method or the like. In S2402, compression parameters are set according to the focus detection result in S2401. When the lens is driven on the basis of the focus detection result in S2401, the compression ratio may be set in consideration of the change in defocus amount due to lens driving. Then, using the compression parameters, compressed image data is output from image sensor 100 in S1204.

According to the fifth embodiment as described above, the compression ratio is set low in the in-focus region to increase the density of the readout pixels, and the compression ratio is set high in the non-focused region to decrease the density of the readout pixels. As a result, it is possible to effectively reduce the power consumption while suppressing degradation of image quality.

Sixth Embodiment

Next, a sixth embodiment of the present invention will be described. In the sixth embodiment, a configuration in which a captured compressed image is transmitted to an image receiving apparatus using wireless communication or the like, and the compressed image is restored in the image receiving apparatus will be described.

Figure 25:
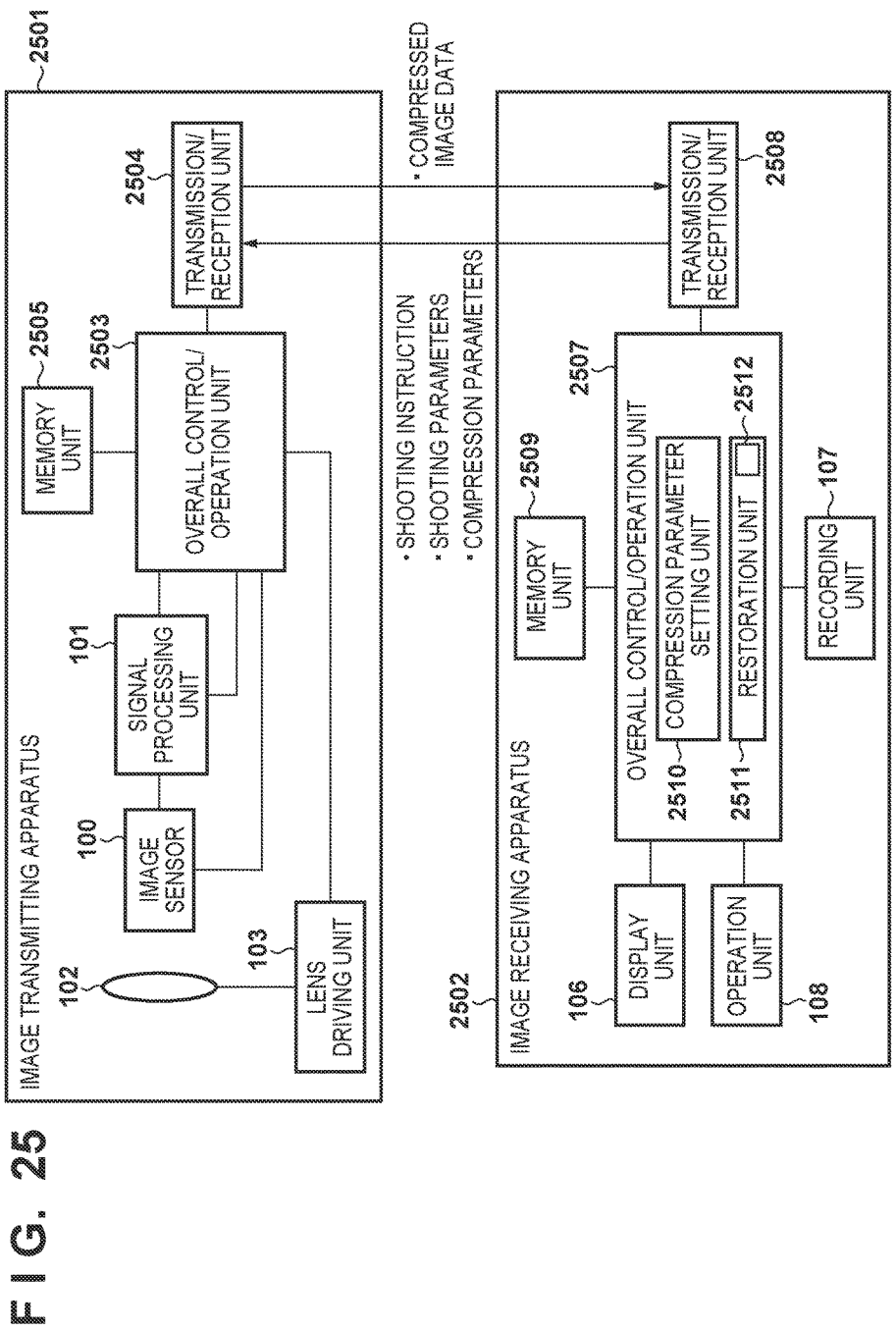
FIG. 25 is a block diagram showing an overall configuration of an image capturing system according to a sixth embodiment.

FIG. 25 is a block diagram showing an overall configuration of an image capturing system according to the sixth embodiment. The image capturing system according to the sixth embodiment is composed of an image transmitting apparatus 2501 which is an image capturing apparatus and an image receiving apparatus 2502. In the image transmitting apparatus 2501 and the image receiving apparatus 2502, the same reference numerals are given to the same components as those in FIG. 1 described in the first embodiment, and the description thereof will be omitted.

An image sensor 100 photoelectrically converts an optical image of a subject formed by an imaging lens 102 and captures it as a signal, and has the same configuration as the image sensor 100 described in the first and second embodiments. A readout pattern generation unit 406 for the image sensor 100 generates a readout pattern based on compression parameters including compression ratio information and a seed value for each divided region transmitted from the image receiving apparatus 2502. The image sensor 100 outputs compressed image data based on the generated readout patterns. A memory unit 2505 temporarily stores the captured compressed image data. An overall control/operation unit 2503 controls the image sensor 100 and a lens driving unit 103 on the basis of a shooting instruction transmitted from the image receiving apparatus 2502, and shooting parameters including ISO sensitivity, exposure time, aperture value, and the like. Also, the overall control/operation unit 2503 sends the compression parameters transmitted from the image receiving apparatus 2502 to the image sensor 100.

Transmission/reception units 2504 and 2508 transmit and receive data between the image transmitting apparatus 2501 and the image receiving apparatus 2502 by wireless communication or the like. The transmission/reception unit 2504 transmits the compressed image data temporarily stored in the memory unit 2505 to the image receiving apparatus 2502. Also, from the image receiving apparatus 2502, the shooting instruction, the shooting parameters, compression parameters and the like are transmitted to the image transmitting apparatus 2501.

An overall control/operation unit 2507 of the image receiving apparatus 2502 includes a compression parameter setting unit 2510 and a restoration unit 2511. The compression parameter setting unit 2510 generates compression parameters including compression ratio information and seed values for respective divided regions as described above in the first and third to fifth embodiments. Furthermore, the compression ratio information for each divided region is set by inputting regions where the user wishes to obtain with the low compression ratio by using the operation unit 108 based on a preliminarily taken image or the like displayed on the display unit 106. The compression parameters generated by the compression parameter setting unit 2510 are transmitted to the image transmitting apparatus 2501 via the transmission/reception unit 2508, and used for shooting processing of the compressed image data.

The memory unit 2509 temporarily stores the compressed image data transmitted from the image transmitting apparatus 2501. The restoration unit 2511 generates a restored image from the compressed image data temporarily stored in the memory unit 2509. The restored image is used for display in the display unit 106, or recorded in a nonvolatile memory or the like by the recording unit 107. In addition, the restoration unit 2511 includes a readout pattern generation unit 2512. This readout pattern generation unit 2512 has a pseudorandom number generator similar to that included in the readout pattern generation unit 406 of the image sensor 100. Thus, based on the compression ratio information and the seed value transmitted to the image transmitting apparatus 2501, it is possible to generate readout patterns used at the time of shooting processing of the compressed image data, and by using the readout patterns, restoration of the compressed image data can be performed. Therefore, it is possible to restore the compressed image data without transmitting the readout patterns from the image transmitting apparatus 2501.

It should be noted that, in a case where compression parameters are set on the side of the image transmitting apparatus 2501 by performing subject detection, moving body detection, frequency detection, focus detection, and so forth, as described in the first to fifth embodiments, the system may be configured such that the compression parameters are sent from the image transmitting apparatus 2501 together with the compressed image data to the image receiving apparatus 2502.

According to the sixth embodiment as described above, it is possible to effectively reduce the power consumption while suppressing degradation of image quality. Further, the readout patterns used in the shooting processing of the compressed image data can be generated in the readout pattern generation unit 2512 on the side of the image receiving apparatus 2502, and the compressed image data can be restored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-079946, filed on Apr. 13, 2017 which is hereby incorporated by reference herein in its entirety.

What is claimed is:

1. An image capturing system comprising:
   a plurality of pixels arranged in a matrix and defining a pixel area;
   a plurality of processors that process an image signal read out from the pixel area;
   a generation circuit that generates a plurality of readout pixel patterns having a plurality of different pixel densities and nonuniform pixel patterns used for reading out a signal from the plurality of pixels;
   a setting circuit that sets one of the plurality of pixel densities for each of a plurality of divided regions obtained by dividing the pixel area; and
   a controller that controls to read out an image signal from each of the plurality of divided regions using the readout pixel pattern corresponding to the pixel density set by the setting circuit,
   wherein the setting circuit sets the pixel density for each of the plurality of divided regions such that a higher pixel density is set to a divided region where image capturing processing with higher image quality is to be performed among the plurality of divided regions.

2. The image capturing system according to claim 1, wherein the controller reduces power supply to the processor corresponding to a pixel from which a signal is not read out of the pixel area on the basis of the readout pixel patterns for the plurality of divided regions.

3. The image capturing system according to claim 1, wherein each of the plurality of processors are provided for each column of the plurality of pixels.

4. The image capturing system according to claim 1, wherein the plurality of processors are provided for the plurality of pixels, respectively.

5. The image capturing system according to claim 1, wherein each of the plurality of processors has at least an amplifier or an analog-digital converter.

6. The image capturing system according to claim 1 further comprising a detection circuit that detects a subject, wherein the setting circuit sets a divided region where an image is to be captured with higher image quality based on a detection result of the subject by the detection circuit.

7. The image capturing system according to claim 1 further comprising a detection circuit that detects a moving body,
   wherein the setting circuit sets a divided region where an image is to be captured with higher image quality based on a detection result of the moving body by the detection circuit.

8. The image capturing system according to claim 1 further comprising a detection circuit that detects frequency of a captured image,
   wherein the setting circuit sets a divided region where an image is to be captured with higher image quality based on the frequency of the captured image.

9. The image capturing system according to claim 1 further comprising a detection circuit that detects a focus state,
   wherein the setting circuit sets a divided region where an image is to be captured with higher image quality based on a detection result of the focus state by the detection circuit.

10. The image capturing system according to claim 1, wherein the setting circuit sets a divided region where an image is captured with higher image quality based on a divided region set by a user.

11. The image capturing system according to claim 1, wherein the generation circuit generates the readout pixel patterns using a pseudorandom number sequence and a threshold value that differs in accordance with the pixel density.

12. The image capturing system according to claim 1, wherein the system has two or more image shooting modes, and the setting circuit determines a number of types of the pixel densities and the pixel densities according to the image shooting mode.

13. The image capturing system according to claim 1, wherein the pixel area further includes a color filter whose colors are arranged in a predetermined color pattern, and
   the generation circuit generates the readout pixel patterns in units of the color pattern.

14. The image capturing system according to claim 1, wherein the generation circuit generates the readout pixel patterns that differ from frame to frame.

15. The image capturing system according to claim 14 further comprising a restoration circuit that generates a restored image corresponding to signals of all the pixels in the pixel area based on images of a plurality of frames read out using the different readout pixel patterns.

16. The image capturing system according to claim 15, wherein the generation circuit generates the readout pixel patterns using a pseudorandom number sequence and a threshold value that differs depending on the pixel density, and
   the restoration circuit generates a same pseudorandom number sequence that the generation circuit generates.

17. An image capturing system comprising:
   a plurality of pixels arranged in a matrix and defining a pixel area;
   a plurality of processors that process an image signal read out from the pixel area;
   a generation circuit that generates a plurality of readout pixel patterns having a plurality of different pixel densities and nonuniform pixel patterns used for reading out a signal from the plurality of pixels;
   a setting circuit that sets one of the plurality of pixel densities for each of a plurality of divided regions obtained by dividing the pixel area; and
   a controller that controls to read out an image signal from each of the plurality of divided regions using the readout pixel pattern corresponding to the pixel density set by the setting circuit,
   wherein the controller reduces power supply to the processor corresponding to a pixel from which a signal is not read out of the pixel area on the basis of the readout pixel patterns for the plurality of divided regions.

18. A control method of the image capturing system that has a plurality of pixels arranged in a matrix and defining a pixel area, a plurality of processors that process an image signal read out from the pixel area, and a generation circuit that generates a plurality of readout pixel patterns having a plurality of different pixel densities and nonuniform pixel patterns used for reading out a signal from the plurality of pixels, the method comprising:
- setting one of the plurality of pixel densities for each of a plurality of divided regions obtained by dividing the pixel area; and
- controlling to read out an image signal from each of the plurality of divided regions using the readout pixel pattern corresponding to the set pixel density,
- wherein the pixel density is set for each of the plurality of divided regions such that a higher pixel density is set to a divided region where image capturing processing with higher image quality is to be performed among the plurality of divided regions.

19. A control method of the image capturing system that has a plurality of pixels arranged in a matrix and defining a pixel area, a plurality of processors that process an image signal read out from the pixel area, and a generation circuit that generates a plurality of readout pixel patterns having a plurality of different pixel densities and nonuniform pixel patterns used for reading out a signal from the plurality of pixels, the method comprising:
- setting one of the plurality of pixel densities for each of a plurality of divided regions obtained by dividing the pixel area; and
- controlling to read out an image signal from each of the plurality of divided regions using the readout pixel pattern corresponding to the set pixel density,
- wherein power supply to the processor corresponding to a pixel from which a signal is not read out of the pixel area is reduced on the basis of the readout pixel patterns for the plurality of divided regions.

* * * * *